United States Patent [19]
Roach, Jr.

[11] Patent Number: 5,845,211
[45] Date of Patent: Dec. 1, 1998

[54] WIRELESS DIGITAL NETWORK

[75] Inventor: Peter O. Roach, Jr., Doraville, Ga.

[73] Assignee: Bell South Corporation, Atlanta, Ga.

[21] Appl. No.: 372,571

[22] Filed: Jan. 13, 1995

[51] Int. Cl.$^6$ ............................... H04Q 7/20; H04Q 7/24
[52] U.S. Cl. .......................... 455/436; 455/433; 455/439; 455/466; 455/560; 455/428
[58] Field of Search .................................. 379/58, 59, 60, 379/93; 455/33.1, 432, 433, 436, 438, 439, 428, 466, 524, 525, 560, 561; 370/60, 60.1, 352–357

[56] References Cited

U.S. PATENT DOCUMENTS

| | | |
|---|---|---|
| 4,777,633 | 10/1988 | Fletcher . |
| 4,811,380 | 3/1989 | Spear . |
| 4,926,495 | 5/1990 | Comroe et al. . |
| 5,090,050 | 2/1992 | Heffernan . |
| 5,175,872 | 12/1992 | Borras . |
| 5,197,092 | 3/1993 | Bamburak . |
| 5,212,753 | 5/1993 | Natarajan . |
| 5,212,806 | 5/1993 | Natarajan . |
| 5,239,673 | 8/1993 | Natarajan . |
| 5,274,841 | 12/1993 | Natarajan et al. . |
| 5,285,494 | 2/1994 | Sprecher et al. . |
| 5,291,476 | 3/1994 | Issenmann et al. . |
| 5,291,543 | 3/1994 | Freese et al. . |
| 5,297,189 | 3/1994 | Chabernaud ............................... 379/58 |
| 5,303,285 | 4/1994 | Kerihuel et al. . |
| 5,303,287 | 4/1994 | Laborde . |
| 5,313,654 | 5/1994 | Comroe et al. . |
| 5,321,735 | 6/1994 | Breeden et al. . |
| 5,325,419 | 6/1994 | Connolly et al. . |
| 5,457,736 | 10/1995 | Cain et al. ................................. 379/60 |

OTHER PUBLICATIONS

"The Sky's the Limit for Wireless WAN's," Data Communications, vol. 22, No. 3, p. 101 (Feb., 1993).

"National Cellular Data Market About to Emerge," Communications Daily, vol. 12, No. 58, p. 2 (Mar. 25, 1992).

Paula Rossler, "Microwave Mushrooms in the Cellular Network," Telephony, vol. 221, No. 23, p. S33 (Dec. 2, 1991).

Primary Examiner—Dwayne Bost
Assistant Examiner—Nay Maung
Attorney, Agent, or Firm—Kilpatrick Stockton LLP; James L. Ewing, IV; Mitchell G. Stockwell

[57] ABSTRACT

A wireless Integrated Services Digital Network ("WISDN") is disclosed. The WISDN replaces conventional wireless networks with a plurality of network elements including intelligent cellsites ("ICSs"), a central site controller ("CSC"), a billing aggregator and an operation and support system, all of which are interconnected to the public switched telephone network ("PSTN") via the integrated services digital network ("ISDN"). The ICSs communicate with users who request services via radio communication. The ICS in which a service requesting user is located interfaces the user with the ISDN, which terminates the user's call using traditional telephony switching methods. When a call to the user is initiated from a PSTN subscriber, the PSTN's service control point may access the CSC, which provides authentication services and routing information (such as the current location of the user) with which the PSTN terminates the call to the selected ICS. Registration techniques provide updates on the user's location. When the user moves out of the coverage area of the selected ICS, it initiates a hand off by sending messages, over the ISDN signalling channel, to surrounding ICSs requesting that each take a reading on the signal from the user. Reports are received from the surrounding ICSs and the selected ICS chooses a second ICS to which the call will be handed off.

20 Claims, 11 Drawing Sheets

WIRELESS DIGITAL NETWORK

The present invention relates to methods and apparatus for deploying and operating a wireless digital network that eliminates conventional wireless Mobile Switching Centers and backhaul networks by using a distributed switching and computing architecture to support wireless communications.

BACKGROUND OF THE INVENTION

The evolution of telecommunication technology has engendered a plethora of systems through which users communicate with one another. Included in the wide array of choices are: the Public Switched Telephone Network ("PSTN"), Private Branch Exchanges ("PBXs"), paging systems, Local Area Networks ("LANs"), ATM networks, Wide Area Networks ("WANs"), Metropolitan Area Networks ("MANs") and wireless networks. Among these systems, wireless networks provide one of the fastest growing communications systems. Indeed, the primary restraint on wireless growth appears to be the higher cost associated with wireless services. Although wireless networks are swiftly growing and evolving, they yet lack the economies of scale offered by the PSTN. They also lack many capabilities of the PSTN, which, with the advent of the Integrated Services Digital Network ("ISDN") (the digital equivalent of the PSTN), now supports such capabilities as fast call hand off, out of voice band signaling and call set up. Complementing ISDN, intelligent telecommunications networks have been deployed that offer a number of new and interesting services for telecommunications subscribers. Call routing, calling card services, call screening and caller identification are some of the services that may now be supported by intelligent networks. The intelligent networks also now permit real time creation and modification of customized features and services desired by particular subscribers. Information relating to the status of services and features desired by subscribers may be maintained in network elements such as Advanced Intelligent Network ("AIN") Service Control Points ("SCPs"), Service Nodes ("SNs"), other Intelligent Peripherals ("IPs") or other intelligent network elements that are available for query by central offices, switches and similar elements of a communications network. Subscribers include those who subscribe to telecommunications, cable or other programming, multimedia or other services, regardless of nature or bandwidth.

Conventional wireless cellular networks are designed using numerous independent cellsites connected via a dedicated network (usually leased lines or microwave) to a Mobile Switching Center ("MSC") that is then connected to the PSTN. The MSC handles all call processing intelligence, switching functionality, fault detection and diagnostics. Because of this conventional cellular architecture, which requires separate and expensive centralized switches (i.e., MSCs), many of the new features made available on the PSTN through deployment of intelligent networks and ISDN are simply not available, or are prohibitively costly, for cellular subscribers. For instance, conventionally, all applications are placed on the MSC, through which calls generated from, or leading to, users in the wireless and other networks (such as the PSTN) are switched. Thus, the new applications available with the deployment of the AIN must be separately deployed on an MSC within the wireless network, at significant cost.

In addition to switching functions and providing applications, call hand offs, crucial to operation of wireless systems, are also handled by MSCs. A call hand off occurs when the wireless system determines a hand off to be desirable or when a call is handed off from an original base station to another, new base station as a mobile subscriber moves out of the range of the original base station and into the new base station's range. The most typical method of completing a call hand off is for the first base station to sense a signal below some predetermined threshold and ask the MSC to arrange a hand off. The MSC asks neighboring base stations to take a power reading on the mobile to determine the best server. After the determination of the best server, the MSC instructs the first base station to transfer the call to a channel on the new base station.

Alternatively, a Mobile Assisted Hand Off ("MAHO") method may be used to complete a call hand off. In a digital system, such as GSM, the mobile unit estimates the channel quality by measuring the received signal strength of adjacent cell sites. (The measurements are usually taken during an idle time slot in which the mobile is neither transmitting nor receiving). After taking the measurement, the mobile unit reports it to the controlling or base station, which, can then, when necessary, compare the received signal strength information associated with other adjacent base stations with a predetermined threshold value, after which the best base station for handling the call is selected. Thus, the controlling base station always knows which base station is the best for providing service to the mobile.

Conventional call hand off does not occur instantaneously. The total call hand off can take up to 15 seconds to determine the best server. During this period subscribers to a particular wireless system may experience voice interruption ranging from 50 to 1,000 milliseconds. While such a small transmission gap can be unnoticeable to a subscriber using the wireless network for voice transmission, such is not the case for data transmission over the wireless network. Transmission gap presents a significant problem if the system serves the rapidly expanding nationwide data network market as even a 250 millisecond delay results in significant data loss even at merely moderate transmission rates. Moreover, modems connected to the wireless network may drop their data link during a longer transmission gap resulting from call hand off delays. Although wireless data modems and digital wireless systems handle this transmission gap better, solving the problem of hand off delay will greatly advance creation of a nationwide wireless data network. Any development of such a network, however, must also address complications caused by the fact that many current wireless networks utilize MSCs produced by different manufacturers, or using different technologies, who have not agreed upon a standard networking protocol. Until a standard protocol is developed and deployed, data transmission through a wireless network may be difficult, if not impossible.

MSCs are also integral to operation of recently developed "micro" cell systems. Such a system utilizes "microcells" that blanket a high use area, or an area where terrain features limit transmission capabilities (e.g., a downtown office district with tall buildings). Because of the greater number of cells, the microcell system can handle a significantly greater volume of traffic. Within each microcell is located a low power transmitter that, after receiving the subscriber's signal, communicates (normally via microwave, public telephone company, or data lines) with a controller, which in turn communicates with the MSC. For microcell system deployment, the conventional cellular architecture, which requires dedicated (and expensive) links between microcells and controllers that are then linked to the MSC, may prove to be too costly and may limit the markets where microcell systems are deployed, the extent of coverage in a given market.

U.S. Pat. No. 5,325,419 to Connolly, et al. discloses a microcell system with base stations that communicate by radio with intelligent portable handsets. Within the Connolly, et al. microcell system, the base stations connect via ISDN with the PSTN. Central to operation of the Connolly, et al. microcell system is the intelligence located in the portable handsets, without which call hand offs and other operations, such as authorizing the use of the microcell system, cannot be completed. These handsets are linked with "a plurality of Service Control Points, which are essentially a PSTN database equipped with SS7 and AIN and additional software which maintains the microcell system user's service feature capabilities and up-to-date current user location by intelligent base station for routing calls."

Connolly, et al., however, is directed only to microcell systems and does not appear to contemplate interfacing existing, currently deployed cellular networks with the ISDN. Without the capability of interfacing existing networks with the ISDN, the capital costs of deploying an entirely new network architecture greatly limit the utility of the Connolly, et al. microcell system. Furthermore, reliance on intelligence in the portable handset limits the deployment of even the microcell system disclosed by Connolly, et al. as current subscribers would be required to purchase new handsets. Thus, Connolly, et al., because of the reliance on special handsets, does not appear to be able to provide services for other users who desire to use the microcell system but have not purchased or leased the special handsets. Moreover, while use of SCPs allows the microcell system access to the AIN, such access may be provided to the cellular provider only at a significant price because of the substantially increased traffic burden placed on the SCPs by the Connolly, et al. microcell system and the use of expensive AIN software. Should the provider of a Connolly, et al. microcell system desire to provide applications not yet deployed on the PSTN, it will either have to pay for deployment of that application (which will require more expensive AIN software) or wait for the local telephone company to deploy the application. Finally, Connolly, et al. simply does not address how to maintain billing records for the disclosed microcell system.

Accordingly, there continues to exist a need for a communications system that utilizes ISDN or an equivalent digital network and is fully compatible with current subscribers' hardware. There also is a need for a cellular system that eliminates the centralized and expensive MSC yet can provide distributed and full switching functionality, as well as decrease the transmission gap between call hand offs in order to improve call hand offs and transmit data more reliably over a cellular network. Furthermore, it is desirable to provide a wireless system that is capable of more efficiently communicating with foreign wireless systems to provide better, less costly service to roaming subscribers.

SUMMARY OF THE INVENTION

A wireless digital network or Wireless Integrated Services Digital Network ("WISDN") is disclosed that uses the PSTN (or another switched network) as the switching architecture, while the Public Packet Switched Network ("PPSN"), or another similar packet data network, provides data connectivity between the various network elements of the WISDN. Intelligent Cell Sites ("ICSs"), which are coupled with or built into, geographically dispersed base stations, independently handle call hand offs between the base stations. A Central Site Controller ("CSC") is used to provide centralized database services, such as customer profile database storage, or support for inter-system hand offs or roaming. A Real Time AMA Processor ("RTAP") and an Operations, Administration & Maintenance System ("OA&M") are also provided to process calling information and provide support to the WISDN. Because the network elements are interconnected through the ISDN, the present invention provides full wireless service (whether traditional cellular services or microcell systems) without the need for a MSC or dedicated backhaul network. Additionally, by eliminating the reliance on a conventional MSC, which is simply a switching and computing platform, the present invention decouples its switching and computing functions to provide increased flexibility and new applications for wireless subscribers.

WISDN Operation

WISDN provides call termination, origination, hand off and numerous other features for subscribers to or foreign users of the WISDN. Briefly, call termination involves routing of calls (which term encompasses voice, data, facsimile, video, image or other communication) to a user (who may be either a WISDN subscriber or a foreign user) associated with a particular ICS. Call origination involves routing calls originated by the WISDN user through an ICS and the PSTN to a party associated with the PSTN. When a user wishes to communicate with a second user, such as a user operating a cellular phone within a vehicle, the WISDN simply uses a combination of call origination and termination processes to terminate the call to the second user. Finally, the WISDN utilizes call hand off for providing continuous call coverage to mobile users.

For example, assume that a mobile "home" subscriber calls a mobile "foreign" user who is currently located within the WISDN, but is not a subscriber to the WISDN. Call origination occurs when the home subscriber originates a call by dialing the foreign user's number, which sends a signal to the "serving" ICS within whose area the home subscriber is operating. The serving ICS checks with the CSC by sending and receiving packet data messages through, for instance, the packet data network, to obtain the data or customer profile information associated with the home subscriber in order to authorize the call and determine the features that the home subscriber has available. Once the call is authorized, the serving ICS assigns a radio channel for communicating over the air with the home subscriber and a bearer channel for communicating with the PSTN. The serving ICS also dials the destination number that the user wishes to access, thereby causing the PSTN to route the call to the desired party.

In this example, because the destination number is the telephone number of a foreign user, the PSTN's SCP immediately queries the CSC to determine where to route the call. If, as the case with this example, the CSC is dealing with a foreign user, it may have to obtain customer profile information from the foreign system. (If instead of a foreign user the called party was a WISDN subscriber, the CSC would simply access a database containing customer profile information for WISDN subscribers). Thus, the CSC may be provided with standard communication protocol in order to communicate with the MSC of the foreign user's home system. (Alternatively, if the foreign user had already registered with the WISDN, the CSC may already have retrieved the customer profile information associated with that foreign user and saved it in a database).

In any event, the CSC, upon accessing the data or customer profile information associated with the foreign user, authorizes the call, determines the foreign user's location and updates that location through sending paging messages throughout the WISDN in order to cause the foreign user's hardware (e.g. mobile phone) to register its current location.

Once registration occurs, the CSC returns the directory number of the "destination" ICS with which the foreign user is currently associated with and the SCP routes the call to the destination ICS, which has received the customer profile information for the foreign user via data messages from the CSC. The destination ICS allocates a radio channel for communicating with the foreign user, contacts the user and terminates the call by connecting the foreign user's mobile phone with an assigned voice/data channel that allows the foreign user to communicate with the home subscriber. (The destination and serving ICSs may also translate the radio communications protocol used by the foreign user's and home subscriber's mobile phones into a protocol appropriate for communication over the PSTN or whatever switched network the WISDN is coupled to).

Mobile users, such as the home and foreign users mentioned above that are operating a cellular phone while traveling, require the WISDN to provide hand off features in order to offer mobile users continuous call coverage areas and optimum signal quality. For example, the home subscriber may move out of radio communication range of the serving ICS, resulting in the need for a call hand off. All hand off processing would be controlled by the serving ICS, which first determines that a hand off is necessary and then determines to which of the surrounding ICSs the call should be handed off. This is accomplished by having the serving ICS send out requests for the surrounding ICSs to take signal strength measurements on the user's mobile phone and report those measurements to the serving ICS. Alternatively, when the system is equipped with MAHO, the serving ICS will already have the signal measurements and therefore can simply choose the best candidate for hand off and generate a hand off request directly to the candidate ICS. When the candidate for hand off is a base station or ICS within an adjacent conventional or WISDN system, the ICS communicates through the CSC to arrange for hand off. (The CSC similarly acts as an intermediary when such a foreign system is requesting that an ICS accept a hand off).

Actual execution of the hand off may be accomplished within, for instance, the central office switches of the PSTN. Basically, the serving ICS will send setup messages that cause the central office switches to arrange a bridge between the serving and candidate ICS. When the call routing is acknowledged by the candidate ICS, the link with the serving ICS is terminated. This can be accomplished by using ISDN features such as fast transfer or automatic link transfer.

Finally, during the actual call between the home subscriber and foreign user, the various elements of the WISDN will be collecting billing and network load data and providing other services to the users of the network. The services that can be provided to users are limited only by the imagination. Thus, for example, the home subscriber may have a feature that interrupts the call with a voice announcement or tone to indicate that a call hand off occurred. Alternatively, if during the call the home subscriber receives another incoming call, the home subscriber may have a call forwarding feature that forwards the incoming call to a voice box. Or, the home subscriber could decide to conference in another call by inputting a preselected command sequence that would cause the serving ICS to access the home subscriber's customer profile, determine the telephone number associated with the command sequence, dial the number, and conference in the new call. Similar services may be provided to the foreign user and billed appropriately.

WISDN Architecture and Network Components

Intelligent Cell Site

An ICS refers generally to the control and interface equipment incorporated into or coupled with a radio base station having an assigned cell coverage area and the PSTN. ICSs are connected to each other, the CSC and the PSTN via ISDN, which carries voice and packet data on the Public Packet Switched Network ("PPSN"). Packet data capability on, for instance, ISDN lines may be used to send control and operations messages between the components of the present invention (ICSs, CSC, OA&M and RTAP). Other private or public networks with packet data capability could also be used in place of the PPSN, however.

By using line features on ISDN voice channels (e.g., call setup or call transfer), each ICS can control the PSTN in order to provide a distributed full switching functionality. The ICSs interface directly with central office switches of a PSTN through an ISDN Basic Rate Interface ("BRI"). The BRI provides two bearer or communication channels plus one data or signalling channel ("2B plus D") capable of carrying digital information at various rates. (A primary rate interface, which provides 23 B channels plus a single D channel or other similar facility may alternatively be used). In addition to the equipment for interfacing with the central office switches, each ICS also interfaces with the RF equipment located at its cell base station. Thus, the ICS will terminate the controlling interface of conventional wireless RF equipment, thereby appearing to be an MSC to the RF equipment. (The controlling interface consists of the user's communications channels (usually voice, data or short messaging) and a data control channel that transmits control messages (including call setup, call hand-off requests, call supervision, maintenance statistics, or alarms)). The ICS converts any controlling interface's (such as the A-interface for an Advanced Mobile Phone System ("AMPS") or the A-bis interface for GSM) control messages, whether analog or digital (GSM, TDMA, E-TDMA, CDMA) standard, into its own controlling interface message set and also may convert the subscriber communications channels into a 64 kbps Pulse Code Modulated ("PCM") digital signal that is transmitted on an ISDN bearer channel into the PSTN. This flexibility allows the use in the WISDN of equipment produced by multiple RF vendors before the very gradual process of standardizing the interface between RF equipment and the switched network is complete.

The ICS may be provided with intelligence that controls its operation, generates calls, hands off calls from one ICS to another and provides billing information either to the RTAP within the network via the ISDN data channel or to a billing aggregator located in another network (public or private). ICSs can also act upon a "user profile," generally retrieved from the CSC or passed on from another ICS, which instruct the ICS on how to process particular calls for specific customers. The profile may contain triggers that instruct the ICS to contact another network element for more information in certain defined situations.

Although the processing of a particular call ceases when the original ICS hands off the call to a new ICS, the original ICS must still report back to the CSC or other network elements in order to maintain accurate call records. For instance, it may be desirable for the ICS to report the start time, stop time, duration and/or any features activated during the call to the RTAP in order for the customer to be appropriately billed. Alternatively, the ICS can be programmed to report back the call processing information to various locations, such as the CSC, RTAP, the MSC of a foreign system from which the CSC accepted a handoff or even a private billing system.

Central Site Controller

The CSC handles the intelligent call processing best served by a centralized database. Such processing includes validations, registrations or location requests for incoming calls as well as maintaining all customer service profiles. To support these functions, the CSC communicates with a Home Location Register ("HLR") and Visitor Location Register ("VLR"), which alternatively may reside on the CSC. (The HLR is a database containing subscriber customer profile information; the VLR is a database containing similar information for visiting users of the WISDN). Thus, the CSC provides the HLR and VLR functionality necessary for both inter-system roaming and directing the PSTN on how to route mobile-terminated calls. Because the CSC is involved only in call origination or termination and feature activations (such as routing calls to Intelligent Peripherals that provide new applications), it is able to support large subscriber volumes.

Customer profile information may be needed to complete the authorization of mobile users, to determine routing because of call features or call trigger activation, to assist in determining the location of a mobile user and to tell the ICS how to process a particular customer. For instance, the customer profile information may indicate that the customer has call waiting. The CSC is responsible for providing such information to the PSTN or the appropriate WISDN elements. Significantly, the CSC is also capable of interfacing with a private system in order for the private system to control the WISDN for the routing of particular calls or the receipt of billing or other information. Also, information relevant to WISDN home customers may be provided by the CSC to other, foreign systems in order to support WISDN home customers who are roaming. The types of information included in such customer profiles are foreign user profiles received from foreign systems, plus additions, changes and deletes of local users (those for whom the WISDN is their home system). The customer profile identifies the call features a customer may have as well as the location of the customer's mobile unit. The location maybe updated by other processes as the customer uses the WISDN. For instance, upon call origination from a mobile subscriber, the ICS of the cellsite in which the subscriber is located reports that subscriber's location. Alternatively, the location of the mobile unit can be updated automatically by autonomous or other registration methods.

Although the ICSs execute hand offs among one another within the WISDN, the CSC handles negotiations with external systems to effect inter-system call hand offs. An inter-system call hand off occurs when the mobile unit roams out of the WISDN and into a foreign system (either a separate WISDN or other network). Alternatively, the CSC negotiates with external systems desiring to hand off a call to an ICS within the WISDN.

A properly programmed computer such as a work station may be used to operate as a CSC, which thus significantly reduces capital costs associated with implementation of the present invention. For instance, the CSC software may run on a standard UNIX workstation platform that does not need to be fault-tolerant. Instead, a duplicate workstation can be tied to the primary CSC through a local area network in order to provide for synchronization of databases. In the event that the primary CSC is unavailable, the PSTN or the ICSs can be instructed to communicate with a backup workstation.

Real Time AMA Processor

Call process information is tracked and maintained within a billing aggregator or RTAP throughout the duration of the call. The types of information included are the start, stop and duration time of a call, call segments, features activation, call state and history, exception handling and any other information needed for billing, statistics and reports. Generally, this type of information is kept in what is referred to as "call state records," which are referenced during call processing to determine the availability and status of a mobile user.

The network elements of the WISDN call processing platform communicate with the RTAP via call event messages. Each ICS keeps track of desired information, including when the call originates, terminates or is handed off, and outputs the information to the CSC over the ISDN data channels and X.25 or other network. The CSC may then assemble the various call detail segments received from the single or numerous ICSs that handled the call and output a unitary message to the RTAP. Alternatively, each ICS may output desired information directly to the RTAP through ISDN data channels and the X.25 or other network. Not every event message need be sent on to the RTAP from the ICS; generally, only those necessary for use with the applications residing on the RTAP may be forwarded. Those applications include analyzing and aggregating the event messages in order to prepare billing records for either immediate posting or delivery to foreign systems' billing centers, or providing statistical and historical reporting and analysis that tracks mobile usage and feature popularity.

Operations/Administration & Maintenance System

Data on the WISDN may be maintained to provide network maintenance, statistics, configuration and administration. The types of information maintained include neighbor lists, zone configurations, component configurations, alarms, network schedules and component statistics. Neighbor list and zone configurations are used during a call process for paging mobile users as well as in determining hand off possibilities.

WISDN Applications

Call Processing

Call requests are received from a user within the WISDN or from another network attempting to route a call to the WISDN. Generally, whenever calls are routed through the WISDN, customer profile information is reviewed to authorize the use of the network by the network user, translate the dialed number into a functional destination (e.g., route to the PSTN, voice mail service or a selected ICS) or locate a registered mobile unit. For instance, when an ICS senses the presence of a mobile unit requesting a call, the ICS provides, through ISDN data channels, data such as the Mobile Identification Number ("MIN") and ESN for an AMPS system of the unit to the CSC, which determines if the user is valid. After confirmation of validity by the CSC, the ICS may receive customer profile information concerning the user and may initiate a call to the requested destination.

Additionally, call processing refers to the in-progress call feature activation available through the use of customer profile information that may include call triggers that are used to interrupt call processing and seek additional information. Such customer profile information can be found within the customer profile information retrieved by the ICS during inter-system hand offs. Calls in progress are constantly monitored in order to determine when to modify the state of a call by activating call features identified in the customer profile. For example, monitoring the call may reveal that the destination number is busy, which may then cause the network to follow a call trigger that activates a feature such as call waiting, call forwarding or selective call forwarding. Mobiles with calls active will generate service requests by dialing digits and pressing the send key, by simply pressing the send key, by inputting touch tone or by simply speaking their request.

Call Hand Off

Each ICS may be interconnected with other ICSs of the WISDN through the ISDN "D" channel and communicate through packet data messages in X.25 transmission protocol. Such interconnection enables the ICSs to hand off calls among themselves without reliance upon a central controller for mobility management, such as an MSC or SCP. Specifically, the original ICS will receive a hand off request from its base station, which has detected that a mobile unit with which it is communicating has hit a predetermined threshold for hand off initiation. If needed, the original ICS therefore notifies, by sending messages over the ISDN data channel to the surrounding ICS's to read the mobile unit's signal strength. These readings are reported to the original ICS, which compares the responses, selects the best, new ICS and signals it over an ISDN data channel to request an available channel for hand off. (Optionally, MAHO may be used to determine the best ICS for handling a particular call with a mobile unit. Using MAHO eliminates the need for sending measurement requests and receiving responses; instead, the original ICS can simply select the best candidate ICS for hand off and generate a hand off request message). The hand off may then be completed by the first ICS signaling the central office switch through an ISDN feature such as fast call transfer or automatic link transfer.

When the ICS wishes to hand off a call to a base station located in an adjacent foreign system, the ICS must route the hand off request through the CSC. Through both the intra- and inter-system hand off operations, the ICS will generate event messages necessary to track the call processing and send them over ISDN signalling channels to the CSC (or to any other destination desired).

Data Concurrency and Redundancy

Customer profiles are located not only in the HLR and VLR databases, but also many of the network elements of the WISDN maintain local customer profile databases. For instance, each ICS may have a local customer profile database for operative calls or calls that were operative within a preselected interval. The database will periodically, when necessary, send requests to its parent profile database located at its CSC to retrieve customer profile data that is not in the ICS's local database. Likewise, each CSC will maintain a local customer profile database and will similarly send requests for customer profile data to its parent profile database, such as the HLR or VLR databases. All databases must be constantly updated and have invalid data deleted. Normally such maintenance takes place at the end of a processing cycle, for example, at the end of the day. However, certain operations cause immediate updates, such as when the mobile unit performs an autonomous registration. After receiving a registration message, the ICS's local database will be updated with the last known area and also forward a message to its parent customer profile database, e.g., the CSC, which forwards the information to its parent database, such as a VLR or HLR.

Communication among the WISDN elements is provided through message interfaces. The types of message interfaces included are communication drivers (e.g., IS-41, X.25, SS7, controlling interfaces), LAN communications (e.g., RTAP to CSC) and future services (e.g., Intelligent Peripherals). These communication drivers send and receive data within the WISDN, as well as to and from components outside of the WISDN through "wireless" cellular interfaces and "wireline" switch interfaces. Data concurrence can be maintained by communication among network elements through the procedures disclosed in U.S. patent application Ser. No. 08/269,917 filed Aug. 20, 1994 and entitled "Data Concurrence," which application is herein incorporated in its entirety by this reference.

Roaming

Because the present invention eliminates the MSC and relies upon the PSTN for switching functionality, it may utilize a virtual private network to route inter-system hand off from WISDN to an "undedicated" trunk to another local switch or another WISDN. A virtual private network eliminates the per minute zone transfer charges incurred by individual calls and allows a monthly charge for all calls to instead be implemented. Such billing change greatly decreases the cost of wireless service for customers who often roam. Thus, the need for a dedicated trunk group is eliminated and WISDN is able to accomplish inter-system hand offs more efficiently.

To provide roamer access port capability (without the normal costs), the WISDN can use switch features of the public telephone company's AIN to provide the required functionally. WISDN can also process calls to allow standard, follow me or automatic roaming.

Some of the benefits offered by the present invention include the:

elimination of the conventional (and costly) MSC(s), base station controllers and backhaul networks;

reduction of capital operations cost for wireless providers and the provision of a cost effective architecture for cellular microcells; and full utilization of the immense capital investment in the PSTN and implementation of the AIN, packet switched networks and ISDN. These advantages allow the wireless provider to:

implement or modify new features faster because of one focal point in the unified WISDN/PSTN;

provide in progress call triggers that allow real time features such as rerouting a call on the loss of signal or allowing and denying hand-off to zones of cells; and in conjunction with the local telephone companies, route Land to Mobile and Mobile to Mobile calls to proper ICSs and hold those calls in the PSTN until the subscriber answers to thereby offer services on incoming or outgoing calls.

By creating a system that integrates the traditional telephony networks (cellular and PSTN), wireless providers can take advantage of growth in the PSTN without significant capital expenditure. Replacing the MSC significantly decreases capital costs and network complexity and results in a network, such as that of the present invention, which allows wireless providers to control the development and implementation of new value-added services and features, rather than relying upon traditional wireless switch manufacturers and the expensive, proprietary platforms they offer. Redundancy in the network is enhanced through distribution of intelligence, which thereby results in a network having multiple platforms and paths for providing communications services. Furthermore, wireless providers can more readily provide new applications or integrate with private systems connected to the PSTN, thus allowing more timely response to consumer demands and technological advances. Finally, the present invention may be used with any network, such as a PBX, having switching means for controlling the network and routing voice, data or imaging digital information through the network. Likewise, the present invention can be utilized to provide conventional wireless service, a wireless data network or personal communications services.

It is accordingly an object of the present invention to distribute intelligence throughout a network in order to provide redundancy in a communication system having multiple network platforms and paths.

It is an object of the present invention to provide simple, low cost software and hardware for a wireless network that is easily developed, deployed and maintained and reduces reliance on proprietary platform.

It is an additional object of the present invention to provide communication services through integrating a wireless network with the Integrated Services Digital Network.

It is a further object of the present invention to provide wireless communication utilizing the switching functionality of the Public Switched Telephone Network.

It is another object of the present invention to provide a wireless network capable of providing intelligent network features to users.

It is an additional object of the present invention to provide Intelligent Cell Sites interconnected through the Integrated Services Digital Network.

It is another object of the present invention to provide a wireless network with Intelligent Cell Sites capable of communicating with one another and independently handing off calls.

It is a further object of the present invention to provide call hand off with significantly reduced transmission gap.

It is yet a further object of the present invention to provide both data, voice and imaging communication between a user and a switched network, such as the PSTN.

It is yet another object of the present invention to provide network support elements including a Real Time AMA Processor and an Operations, Administration and Maintenance system.

It is an additional object of the present invention to provide wireless communication at significantly reduced capital costs through the elimination of a conventional MSC and backhaul network and use of the PSTN or another switched network for the switching architecture necessary to route mobile originated and terminated calls.

It is yet a further object of the present invention to provide integration of public and private wireless systems through the distribution of intelligence and use of standard interfaces.

Other objects, features and advantages of the present invention will become apparent with respect to the remainder of this document.

DETAILED DESCRIPTION OF THE DRAWINGS

Figure 1:
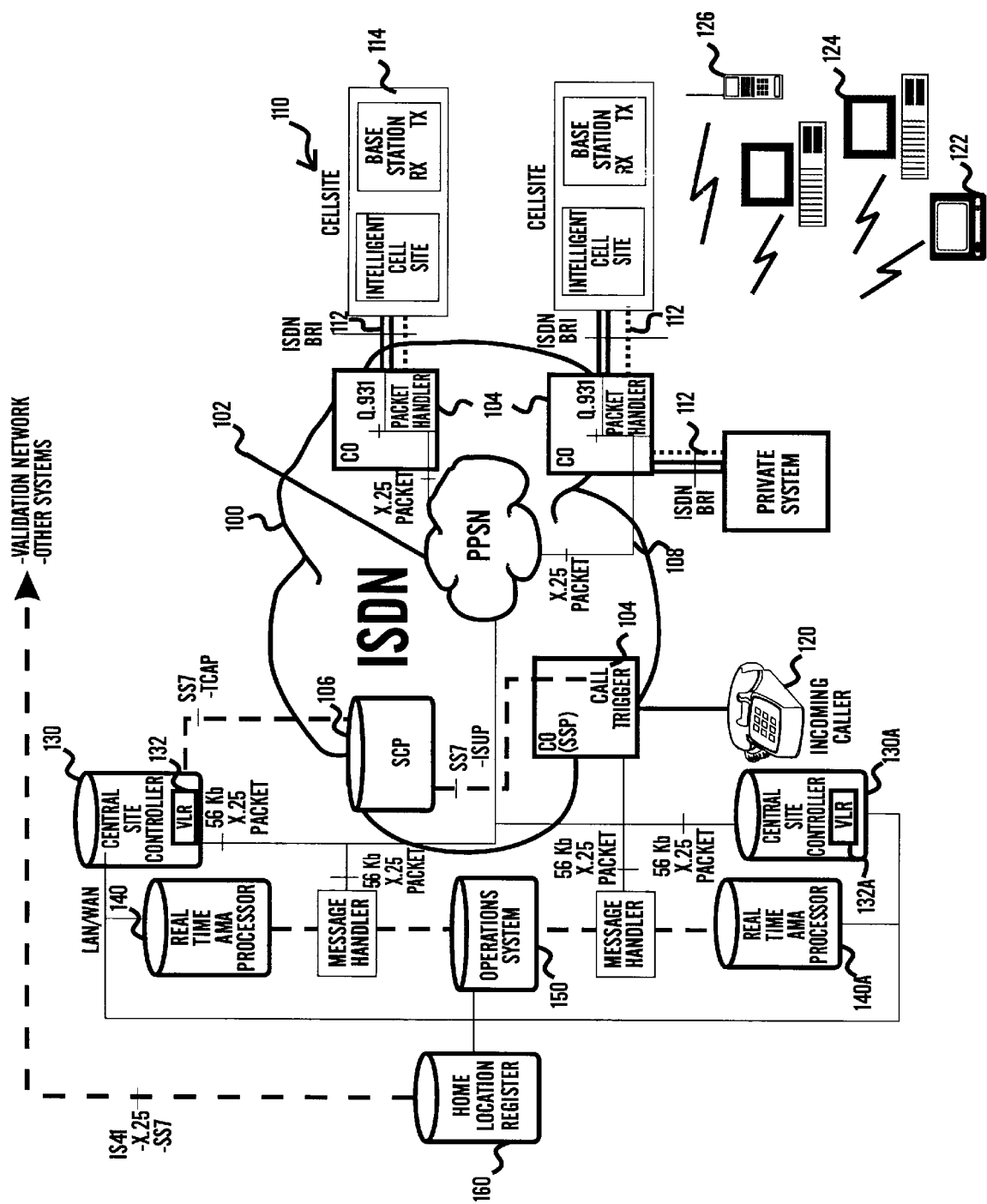
FIG. 1 is a diagram illustrating the architecture of a Wireless Integrated Services Digital Network of the present invention.
Figure 2:
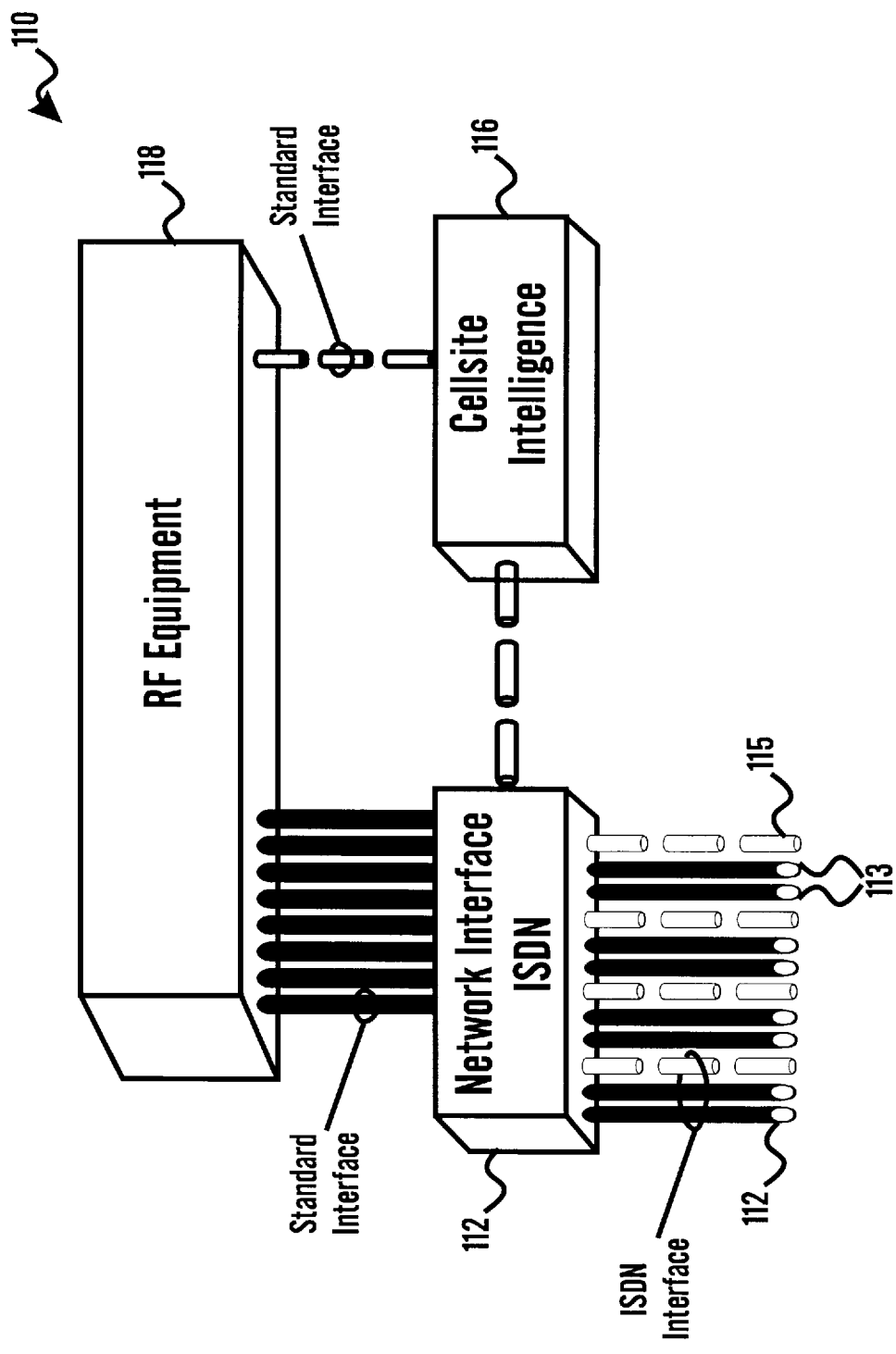
FIG. 2 is a schematic diagram showing the components of an Intelligent Cell Site of the present invention.

FIG. 1 illustrates an Integrated Services Digital Network or ISDN 100 that includes the switching elements of the PSTN and a Public Packet Switched Network or PPSN 102. ISDN basic rate interface ("BRI") line(s) 112 connect an Intelligent Cell Site or ICS 110 to the ISDN 100. ISDN BRI lines 112 may have two 64 kbps bearer channels 113 and one 16 kbps data or signalling channel 115. Primary Rate Interface lines or other advanced interfaces such as TR 303 or ATM may also be used. An Advanced Intelligent Network-Signalling System 7 ("AIN-SS7") may be deployed over ISDN 100 such that the AIN-SS7 is capable of controlling the processing of a communication via remote databases. As shown in FIG. 2, ICS 110 terminates the controlling interface of RF equipment 118, located at base station 114, which communicates with wireless subscribers' hardware, such as pager 122, computer 124 and mobile unit 126. Land phone 120 is connected via the ISDN 100 to the central office switch 104 that in turn communicates with Service Control Point or SCP 106. Other data or voice communication equipment could also be used with the present invention. Generally, the present invention may be used to provide voice, data or imaging communication between users equipped with wireless capability and equipment connected to the ISDN 100 or any switched network, such as a PBX, having ISDN 100 or similar capability.

A Central Site Controller or CSC 130, provided with a Visitor Location Register or VLR 132 that contains user profile information for visiting users of the mobile system, also communicates with the SCP 106 of the ISDN 100. The PPSN 102 offers X.25 packet data channels 108 between the CSC 130, Real Time AMA Processor or RTAP 140, Operations, Administration & Maintenance system or OA&M 150 and a Home Location Register or HLR 160, which may be any database capable of containing the locations and customer information of the registered mobile subscribers of the network.

PPSN 102 will also be connected to each of the PSTN's central office switches 104 that may serve ICSs 110 so that they can communicate with the other network elements through sending and receiving X.25 packet data messages. Also shown in FIG. 1 are backup stations, including CSC 130A, VLR 132A and RTAP 140A. By maintaining the databases on these backup units equivalent to the primary units, the redundancy and reliability of the network architecture is greatly increased. In the event of the failure of one or all of the primary stations (i.e., CSC 130, VLR 132 or RTAP 140), the PPSN 102 or the ICSs 110 can be instructed to communicate with any or all of the backup stations CSC 130A, VLR 132A or RTAP 140A without loss of or decreased efficiency in providing full service. Alternatively, if ICSs 110 attempts to communicate with primary stations fail, after a set time period, the ICSs 110 may automatically direct communications to the backup stations.

FIG. 2 illustrates the components of the ICS 110. ICS 110 interfaces with a base station 114 that has Radio Frequency or RF equipment 118 that generally converts the control messages and voice or data signals from the subscriber to a protocol the conventional MSC understands. RF equipment 118 communicates with, for instance, a subscriber's mobile phone 126 via the AMPS or other protocols, including such digital protocols as Code Division Multiple Access ("CDMA"), Time Division Multiple Access ("TDMA") or Groupe Speciale Mobile (also known as global system for mobile communication—"GSM")." (Information relating to these standards can be found in the TIA publication entitled, "Cellular System Dual Mode Mobile Station—Base Station Compatibility Standard," IS-54-B (Telecommunications Industry Ass'n, April, 1992), the EIA publication entitled, "Mobile Station—Land Station Compatibility Specification IS-533 (Electronics Industry Ass'n, September, 1989) and in "the GSM System for Mobile Communications," by M. Mouly and Marie-B. Pautet (1992), each of which documents is hereby incorporated in its entirety by this reference). Generally, RF equipment 118 can communicate with any base station 114 having signalling and communication radio channels. ICS 110 has cellsite intelligence 116 that could be a personal computer, work station or computing device, such as an 80×86 (PC) based machine with a real-time operating system. Cellsite intelligence 116 can have outlets for plug-in cards that provide termination of the controlling interface or ISDN BRI lines 112, n-band DTMF (dual tone multi-frequency) detection or plain voice announcements via digital signal processor chips. DSP chips could also be utilized to perform the vocoder functionality (compressing voice signals to 64 kbps PCM digital).

While FIG. 2 shows ICS 110 interfaced with a base station 114 that could be an already deployed base station 114, other configurations of ICS 110 are possible. For instance, ICS 110 could be a modified base station. That is, a normal base station 114 could be upgraded to an ICS 110 by installing the components outlined above.

ISDN BRI lines 112 allow the ICS 110 to access various ISDN 100 features, described in Bellcore Document No. SR-NWT-001937, which is hereby incorporated in its entirety by this reference. ISDN 100 features that the ICS 110 may access include call forwarding, call hold, additional call offering, flexible calling, calling number identification services, electronic key telephone system and call pickup, which features are described in the following Bellcore Source Documents: "ISDN Call Forwarding," TR-TSY-000853 (December 1988 & Supps. 1 and 2); "ISDN Call Pickup," TR-TSY-000854 (December 1988 & Supp. 1); "ISDN Hold Capability for Managing Multiple Independent Calls," (TR-TSY-000856 (December 1988 & Supp. 1); "Additional Call Offering for Managing Multiple Independent Calls," TR-TSY-000857 (December 1988 & Supp. 1); "Flexible Calling for Managing Multiple Independent Calls," TR-TSY-000858 (December 1988); "ISDN Calling Number Identification Services," TR-TSY-000860 (February 1989 & Supp. 1), each of which documents is incorporated herein in its entirety by this reference.

ICS 110 is deployed at, or incorporated as part of, the base station 114, which may already be a part of a formerly conventional wireless network that has been converted into a WISDN. A standard interface 119 communicates with the RF equipment 118 via an appropriate communication protocol. Because the ICS 110 appears to the base station 114 to emulate a conventional MSC, and conventional radio equipment has certain communication protocols with which to communicate with the MSC, the cellsite intelligence 116 may also be equipped with appropriate communications software that will allow the ICS 110 to interface with the RF equipment 118 over the standard interface 119. A network interface 117 allows communication with the ISDN 100 through the ISDN BRI lines 112. Network interface 117 can be provided with numerous ISDN BRI lines 112 and supporting boards, depending on the planned traffic through that particular ICS 110. As traffic increases or decreases, the number of ISDN BRI lines 112 provided by ICS 110 can be appropriately altered to accommodate traffic changes. ICS 110 does not need physical switching capability on its network interface 117 because the telephony bus (e.g., a Multi-Vendor Interface Protocol ("MVIP") or Industry Standard Architecture ("ISA") bus) allows the ICS 110 to connect RF voice channels to the network interface 117.

If the ICS 110 reaches capacity or is having processing problems, it can transfer (through a process similar to the hand off process described below) the call to a neighboring ICS. Generally, an ICS 110 may support an average of thirty voice channels; however, more or fewer channels may be supported depending on the memory capacity of ICS 110 and the number of slots into which ISDN BRI, CPU, DSP or analog cards can be placed. Each ICS 110 can operate under a UNIX System 5.4 operating system that may be scaled down to minimize the amount of system memory and other resources needed to run the operating system. Other operating systems may be utilized, however. Software for the ICS 110 may be designed and implemented as a set of call control and resource managers (or daemons) for managing hardware and software interfaces. A single asynchronous serial port (with a 0.3 to 19.2 kbps capacity) can be provided in the ICS 110 for local maintenance work.

CSC 130, RTAP 140, and OA&M 150 utilize functionally separate software that could, for instance, run on a single standard UNIX work station platform if economy is sought. However, the CSC 130, RTAP 140 and OA&M 150 may each run on a separate UNIX work station platform in order to provide redundancy. As for the ICS 110, a set of daemons or modules of call control and resource managers can be deployed for managing the hardware and software interfaces of the various network components. Such software may be implemented to limit or eliminate reliance on expensive AIN software and operating systems while allowing network operators to develop their own control modules to customize their networks.

Registration

Generally, in order to route calls to and from mobile units 126 communicating with the WISDN, it is necessary either to know or determine the location of the appropriate mobile unit 126. A customer profile database, such as HLR 160, stores the location of home or WISDN customers in the customer profile. As a WISDN customer moves throughout the various cells making up the WISDN, the location of the customer may be updated by registration. Numerous methods exist to register mobile subscribers. For instance, the CSC 130 can cause the ICSs 110 to send out paging messages causing the mobile units to report their location to the base station in the cell in which they are located. Or, instead of paging the entire network, zone paging, based on the mobile unit's 126 last known location can be utilized. Alternatively, the mobile units can be programmed to register periodically with a base station.

Figure 3:
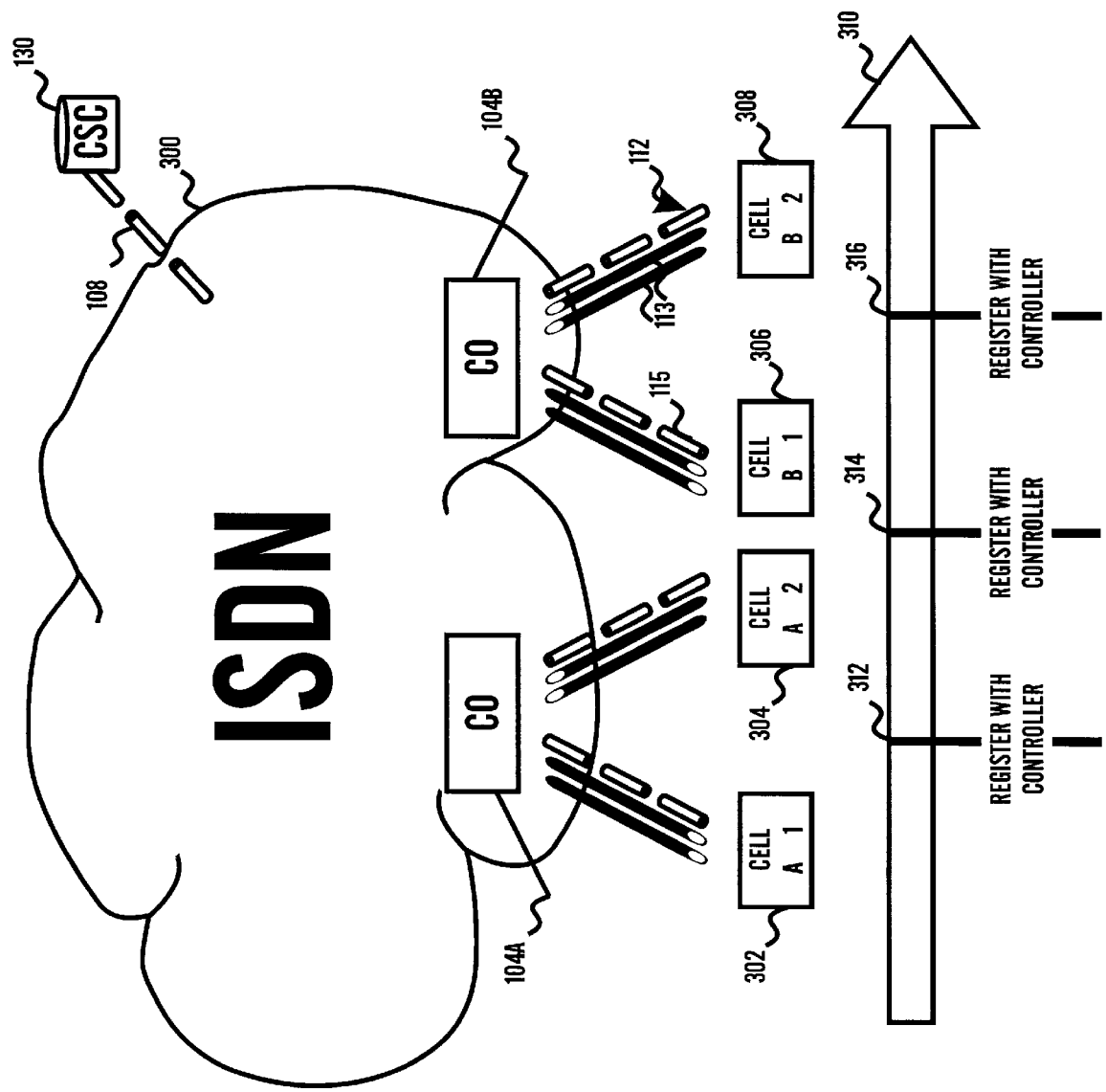
FIG. 3 is a diagram illustrating the registration of a mobile user moving into different cells of the network of the present invention.

An autonomous registration is shown in FIG. 3, which illustrates the first, second and third registration points 312, 314 and 316 at which a mobile unit 126 will register as it moves through the first, second, third and into the fourth cell 302, 304, 306 and 308. For instance, as the mobile unit 310 moves from first cell 302 into second cell 304, it registers with the second cell 304, which sends a message over the ISDN 100 data link 115 through the central office switch 104A to packet data connection 108. Eventually the registration message may be used to update the HLR 160 or VLR 132, depending on whether the registering mobile unit 126 is a WISDN customer or roamer. Similarly, the mobile unit 310 also registers at second and third registration points 314, 316 as it moves from the second cell 304 to the third cell 306 and from there to the fourth cell 308, respectively. However, cells can be grouped to cause registration of mobile units in groups of cells.

The data stored in the HLR 160 may also be provided, through the IS-41 gateway (see FIG. 1), to foreign systems in which WISDN customers are roaming. Similar to the HLR 160 is the VLR 132 that stores customer profile information concerning foreign customers or "roamers" utilizing the WISDN. VLR 132 obtains such information from the roamer's home system.

Call Origination and Termination

Land to Mobile

Figure 4A:
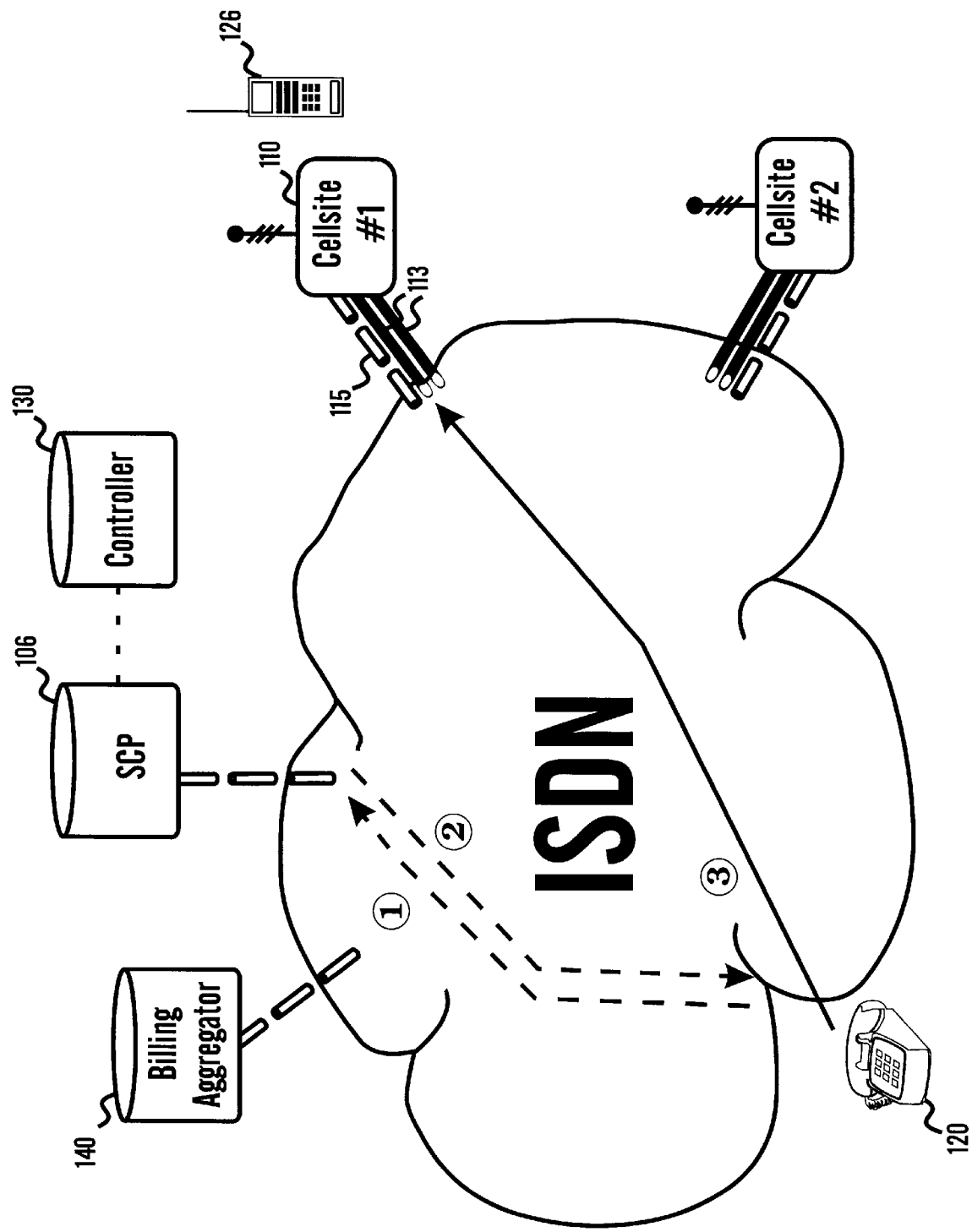
FIG. 4A is a diagram illustrating the origination and routing of an incoming call from a land phone, connected to the ISDN, to a mobile unit through operation of the present invention.

FIG. 4A generally shows a process of routing an incoming call. Central office switches 104 are programmed with triggers so that when a mobile number has been dialed by a land phone 120, a routing query will be launched to the SCP 106, the online database within the PSTN. SCP 106 may support a common communication protocol, such as IS-41, to thereby communicate with the CSC 130 to query the CSC 130 for instructions on how to route the call.

Upon receiving the query, the CSC 130 will create a Call State Record ("CSR") and collect such information as the equipment information (e.g. the MIN if the call is mobile originated), originating call or identification (who the call is directed to) and the dialed digits. If the user is foreign, CSC 130 generates a customer profile request, sending via the ISDN 100 and IS-41 protocol the customer ID and equipment information to the user's foreign system to obtain customer profile information for loading into the VLR 132. After receiving a customer profile response from the VLR 132, the CSC 130 authorizes (or denies) the call. If authorized, the customer profile, (e.g., customer ID, equipment information and feature information) is sent to the ICS 110.

Once the CSC 130 has referenced the HLR 160 (for home users) or VLR 132 (for visiting users) to determine where to route the call so that it reaches the ICS 110 covering the cell in which the desired mobile unit 126 may be contacted, it informs the SCP 106 where to route the call. SCP 106 will then instruct the central office switches 104 on how to route the call from the land phone 120 to the ICS 110 that is communicating with a mobile unit 126.

Figure 4B:
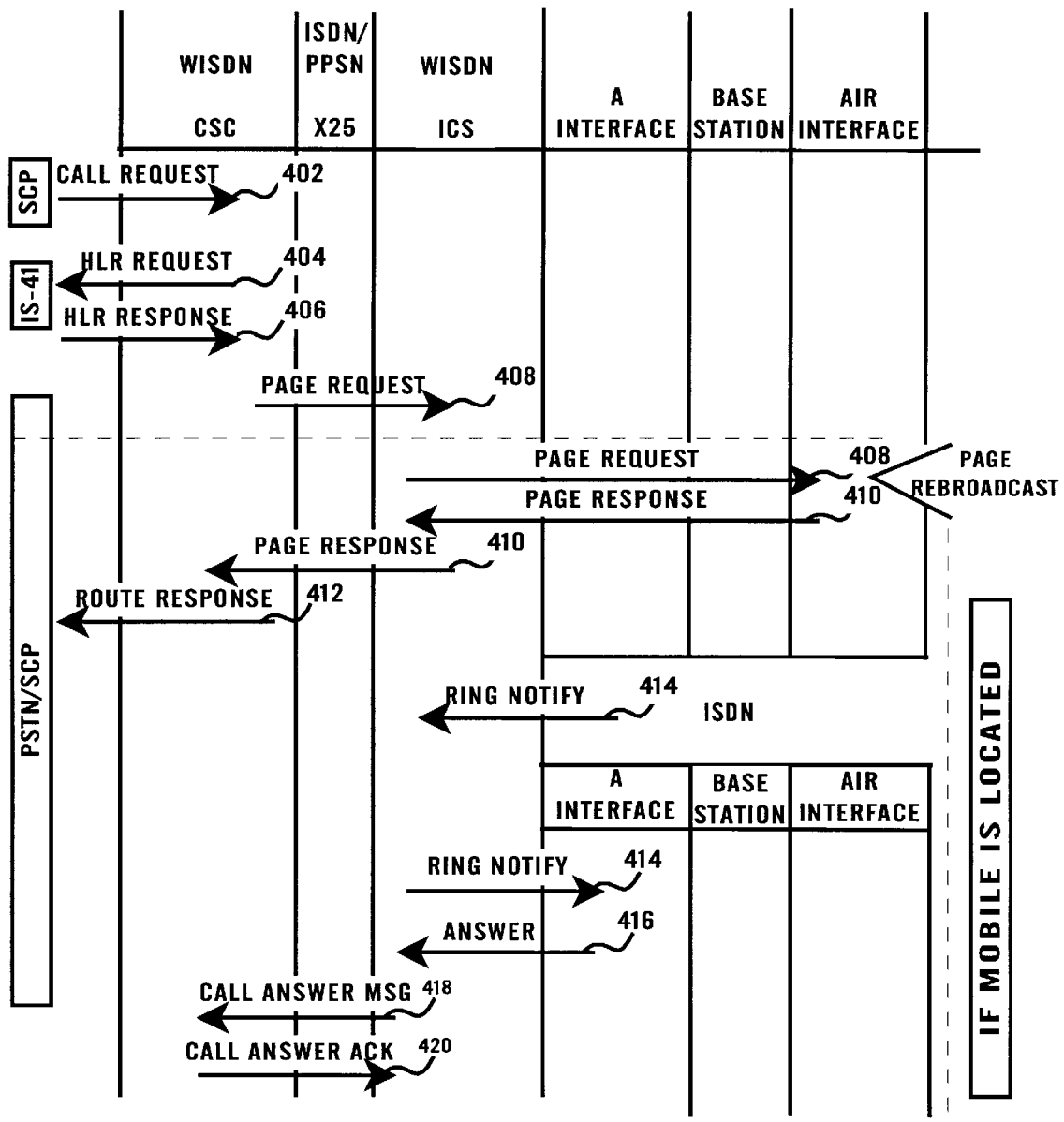
FIG. 4B is a flow diagram showing the steps necessary for completing the origination and routing of an incoming call from the land phone connected to the ISDN to the mobile unit.

As shown in FIG. 4B, in handling land to mobile calls, the SCP 106 of the ISDN 100 sends a call request 402 to the CSC 130 once a mobile number is dialed in order to determine whether the user is valid and what features the user has available. After receiving the call request 402 from SCP 106, the CSC 110 launches an HLR request 404 for customer profile information to HLR 160. (In the event that the user is not a WISDN customer, the CSC 110 checks with the VLR 132 and/or communicates over the IS-41 with the user's foreign system to validate the user and obtain profile information, as previously described). Upon receiving the HLR response 406, which may include call processing triggers, the CSC 110 then determines in which cell the mobile unit 126 is currently located in, by referencing the data received from the HLR 160 or VLR 132 or by initiating a page request 408, which, through conventional methods such as zone paging and/or broadcast paging, may locate the mobile user. (Zone paging sends a paging message to a zone of cells surrounding the customer's last known location, which is updated after a mobile unit 126 autonomously registers; broadcast paging sends a paging message to every cell in the system. Autonomous registration is used with zone paging because autonomous registration commands the mobile unit to register itself at selected intervals or when the mobile changes zones. In the event zone paging does not locate the mobile unit, broadcast paging can be used). Page request 408 is sent from the CSC 130 to the ICSs 110 via X.25 data messages through the PPSN 102 over the ISDN data channel 115. ICSs 110 then pass the page request 408 on to the base station 114 for transmission over radio control channels.

Assuming the mobile unit 126 is operative and located, it returns a page response 410 over a radio control channel identifying itself and indicating that it is available to accept the call. Base station 114 for the first cellsite in which the mobile unit 126 is located picks up this signal and passes it on to the ICS 110, which assigns the mobile unit 126 a radio frequency channel. ICS 110 also assigns an bearer channel 113 to the call while simultaneously notifying the CSC 130 that the mobile unit 126 is within the ICS's 110 cell by passing on the page response 410. Included within the page response 410 is the directory number associated with the ICS 110 that is communicating with the mobile unit 126. CSC 130 downloads that subscriber's customer features to the ICS 110. CSC 130 will then send a route response 412 to the SCP 106 that includes the directory number of the ICS 110 and other information necessary to allow SCP 106 to route the call to the ICS 110, which connects the call with the bearer channel 115 assigned to the mobile unit 126.

ICS 110 receives through the ISDN 100 a ring notify message 414 that it passes over the radio control channel and which instructs the mobile unit 126 to audible ring. The user hears this ring and presses the "send" key, which causes the mobile unit 126 to send an answer 416 to the ICS 110 over the radio voice channel informing the ICS 110 that the mobile unit 126 is available for the call. ICS 110 generates a call answer message 418 for transmission to the CSC 130 and receives a call answer acknowledgement 420, which allows CSC 130 to update the Call State Record to indicate that the mobile unit 126 is engaged in a call. Thus, the CSC 130 can respond appropriately should another incoming call directed to the mobile unit 126 be received. (One such response could be to forward the incoming call to a voice mailbox, or, if the mobile unit 126 has call waiting, to play a tone indicating that another call is incoming).

Once the voice conversation (or data transmission) begins, the cellsite intelligence 116 communicates over the standard interface 119 with the RF equipment 118 to have it send and receive information. Information sent from the mobile unit 126 may be converted into the appropriate protocol for transmission over the RF equipment 118; similarly, information received from the mobile unit 126 may be converted into the protocol necessary for transmission over the ISDN BRI interface 112.

Optionally, verification that the correct call has been routed to the mobile unit 126 may be provided through call processing functions. A CSR is created at the start of the Land to Mobile call and the calling line ID of the land phone 120 may be input into the CSR, which is downloaded to the destination ICS 110. When a ring notify message 414 arrives, the calling line ID of the caller (which may be part of the information comprising ring notify message 414) may be compared with the land phone's 120 calling line ID located within the CSR. If a match is found, the ICS 110 will instruct the mobile unit 126 to audible ring; otherwise the incoming call will be killed, although the resources allocated to the incoming call may be maintained for a preselected time to allow the correct routing of the call initiated by land phone 120.

In the event that the call communication fails or the mobile unit 126 returns a busy signal, call features and/or triggers may activate. Such call features may forward the call to another number or voice mail, or make a DSP announcement to the user of the mobile unit 126 that the call could not connect.

Mobile to Land

Figure 5A:
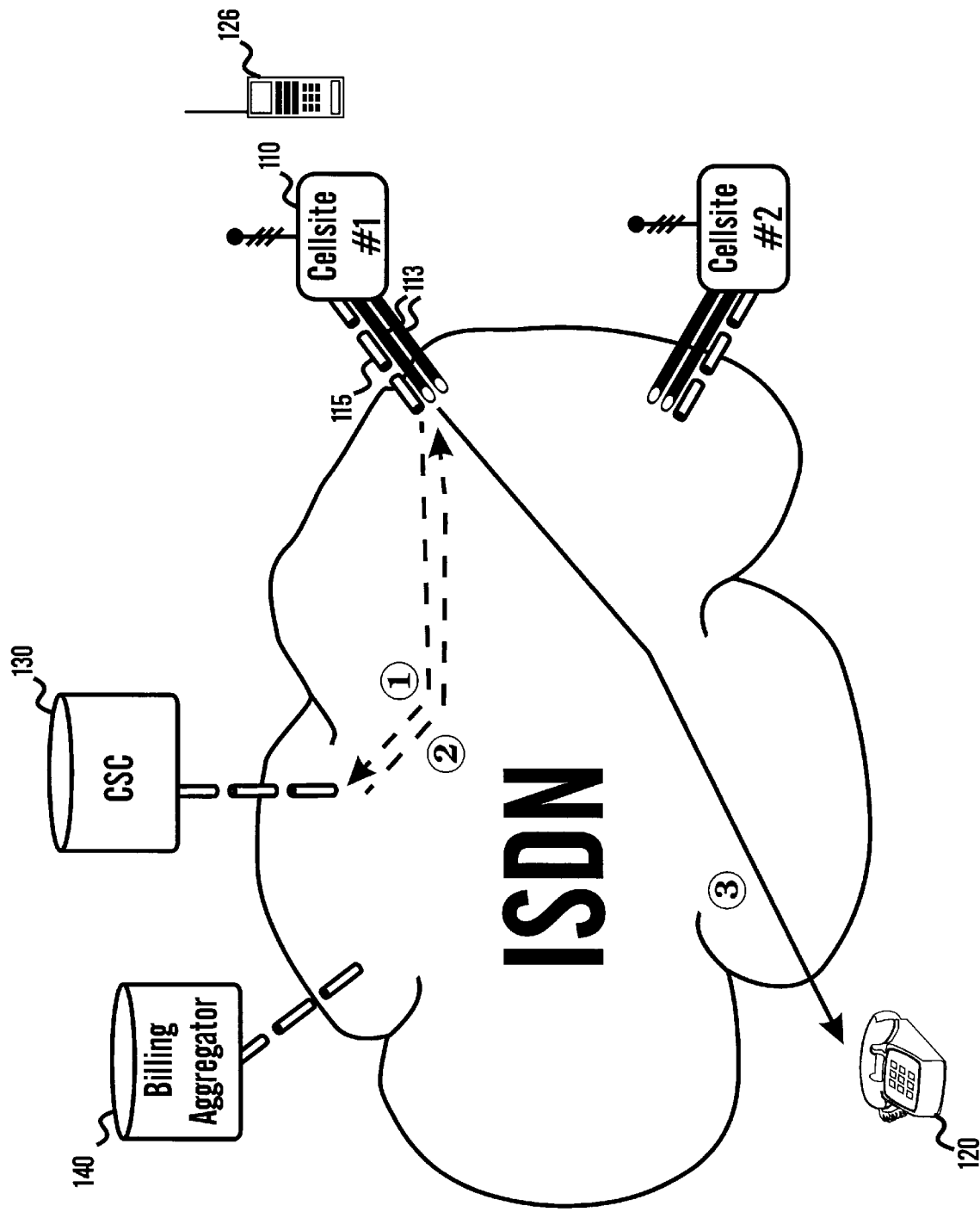
FIG. 5A is a diagram illustrating the routing of an outgoing call from a mobile unit located within a first cell to a land phone connected to the ISDN.
Figure 5B:
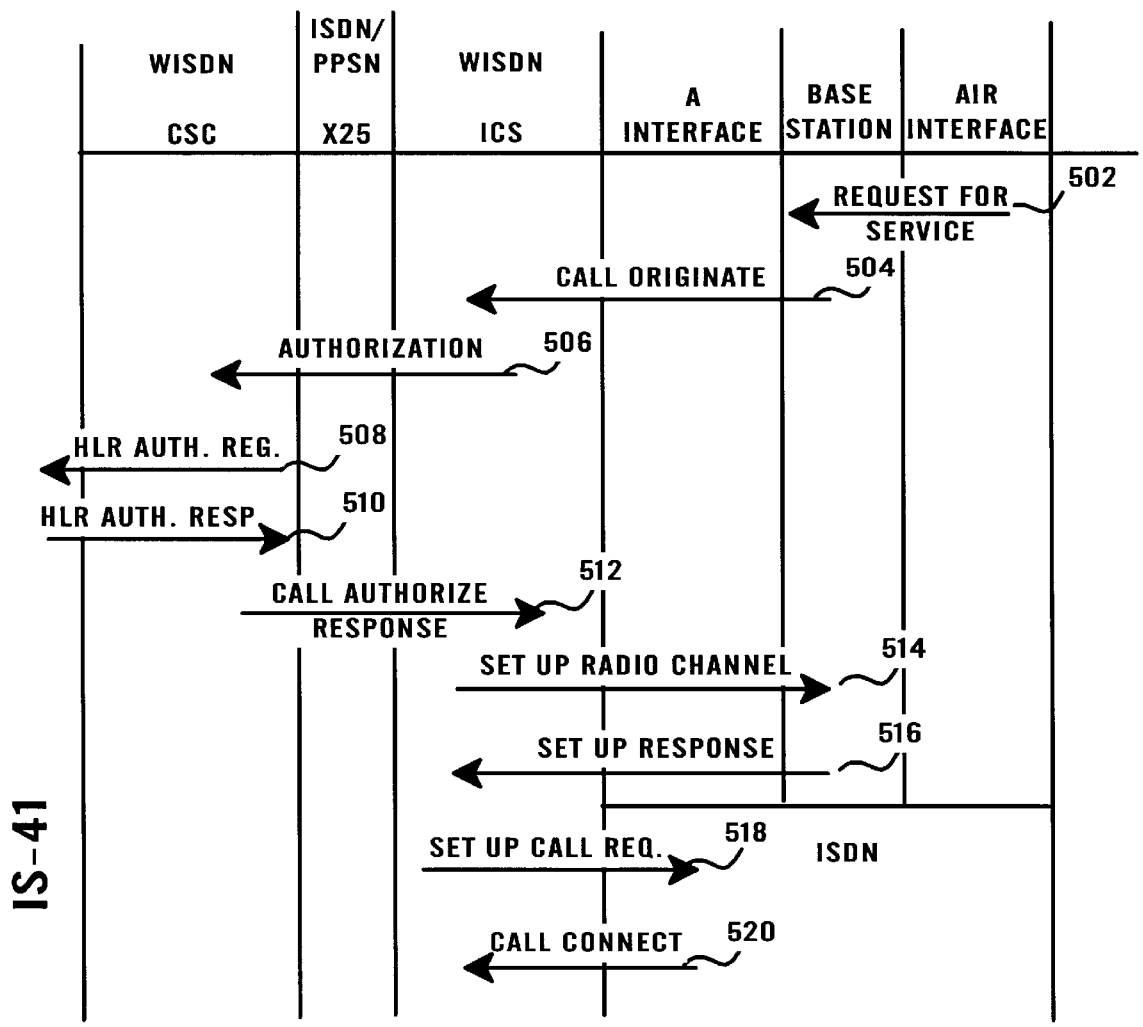
FIG. 5B is a call flow diagram showing the steps necessary to route the outgoing call from the mobile unit located within a first cell to a land phone connected to the ISDN.

FIGS. 5A–B illustrate the routing of an outgoing call from a mobile unit 126 through the ISDN 100 to a land phone 120. Generally, the mobile unit 126 initiates the call by sending signals to the base station 114 located in the first cellsite. ICS 110 associated with the base station 114 communicates with the CSC 130 to determine whether the mobile unit 126 is valid, to obtain customer profile information, and to obtain the correct routing number for the digits input by the subscriber. This number translation is needed should the user dial codes or digits not valid for routing in the PSTN (e.g., *flowers). ICS 110 then dials the correct number provided by the CSC 130 (e.g. the telephone number associated with *flowers), which causes the central office switches 104 to route the call through the ISDN 100 to the appropriate land phone 120.

As seen in FIG. 5B, the mobile unit 126 sends a request for service 502 to the base station 114 over a radio control channel. A call originate message 504 is generated at the base station 114 and passed through the RF equipment 118 to the ICS 110, which then sends through an ISDN data channel 115 an authorization request 506 to the CSC 130 in order to determine whether the mobile unit 126 is valid and what features the mobile unit 126 has. By generating an HLR authorization request 508, the CSC 130 may check the registration identification of the mobile unit 126 against the customer profiles in the HLR 160 to determine whether the user of the mobile unit 126 is a subscriber to that system. If the mobile unit 126 does not subscribe to the WISDN, the CSC 130 may temporarily assign the mobile unit 126 an identity and store that identity in the VLR 132. CSC 130 may also query, through IS-41 messages, the mobile unit's 126 home system to determine whether the mobile unit 126 is valid there and what features should be provided. Responses to these queries are returned to the VLR 132. Once the CSC 130 receives either an HLR authorization response 510 or assigns a valid roaming mobile unit 126 a registration number, it authorizes ICS 110 to proceed with the call by sending back through the ISDN 100 data channel 115 a call authorize response 512, which may contain customer profile information associated with the mobile unit 126.

ICS 110 requests the base station 114 through a set up radio channel message 514 to assign the mobile unit 126 a radio frequency channel and simultaneously dedicates one of its ISDN bearer channels 113 (capable of carrying PCM voice or data) to complete the call. Base station 114 passes a set up response 516 to the ICS 110 to indicate the radio channel has been assigned so that the ICS 110 may connect that channel with the assigned bearer radio channel 113. Mobile unit 126 tunes to the assigned frequency and the ICS 110 connects that frequency to the appropriate bearer channel 113. ICS 110 goes off-hook and originates the call by dialing the digits of the terminating number and sending a set up call request 518 through the ISDN 100 to the SCP 106, which terminates this call to the land telephone 120 via traditional telephony call routing methods and sends a call connect message 520 back to the ICS 110.

Mobile to Mobile

The call processing associated with a mobile to mobile call begins with a mobile unit 126 originating a call in the same manner as in the mobile to land call described above and illustrated in FIGS. 5A–B. Once the ICS 110 dials the destination digits on the assigned bearer channel 113, the ISDN 100 must query the CSC 130 to determine the location of the mobile unit 126 and terminate the call in the same manner as described in the terminating portion of the land to mobile call process illustrated in FIGS. 4A–B.

Land to Land

Because of the higher cost associated with providing wireless service, some wireless users utilize voice mail while they are on the road (especially when they might roam into foreign areas with their higher associated costs). The present invention allows the CSC 130 to route a call to a voice mailbox. Thus, for example, a call begins with a land line telephone 120 originating a call in the PSTN and the SCP 106 querying the CSC 130 to determine how to route the call. CSC 130, after referencing the customer profile information, may learn that the user has indicated that calls should be routed to a voice mail box or perhaps a land line phone at which messages can be left or the subscriber will be located for a set period of time. (Such instruction can be triggered by any number of events, including for instance, the inability to locate the mobile unit, the receipt of a busy signal or even previous instructions from the subscriber to route all calls within a certain time period to a voice mail box). Accordingly, the CSC 130 returns a land line telephone number that the SCP 106 uses to complete the call.

It is common practice for wireless carriers to keep billing records for the duration of all wireless calls and it is therefore necessary to record even those calls transferred to a commercial voice mail system or forwarded to a landline telephone number. Accordingly, in order to provide a record of the call, the PSTN can provide to the RTAP 140 of the WISDN call detail records in a manner similar to the provision of such information to PBXs. Otherwise, the land to land calls can be transferred through a designated ICS 110 in order that a call detail record will be generated.

Termination

Figure 6:
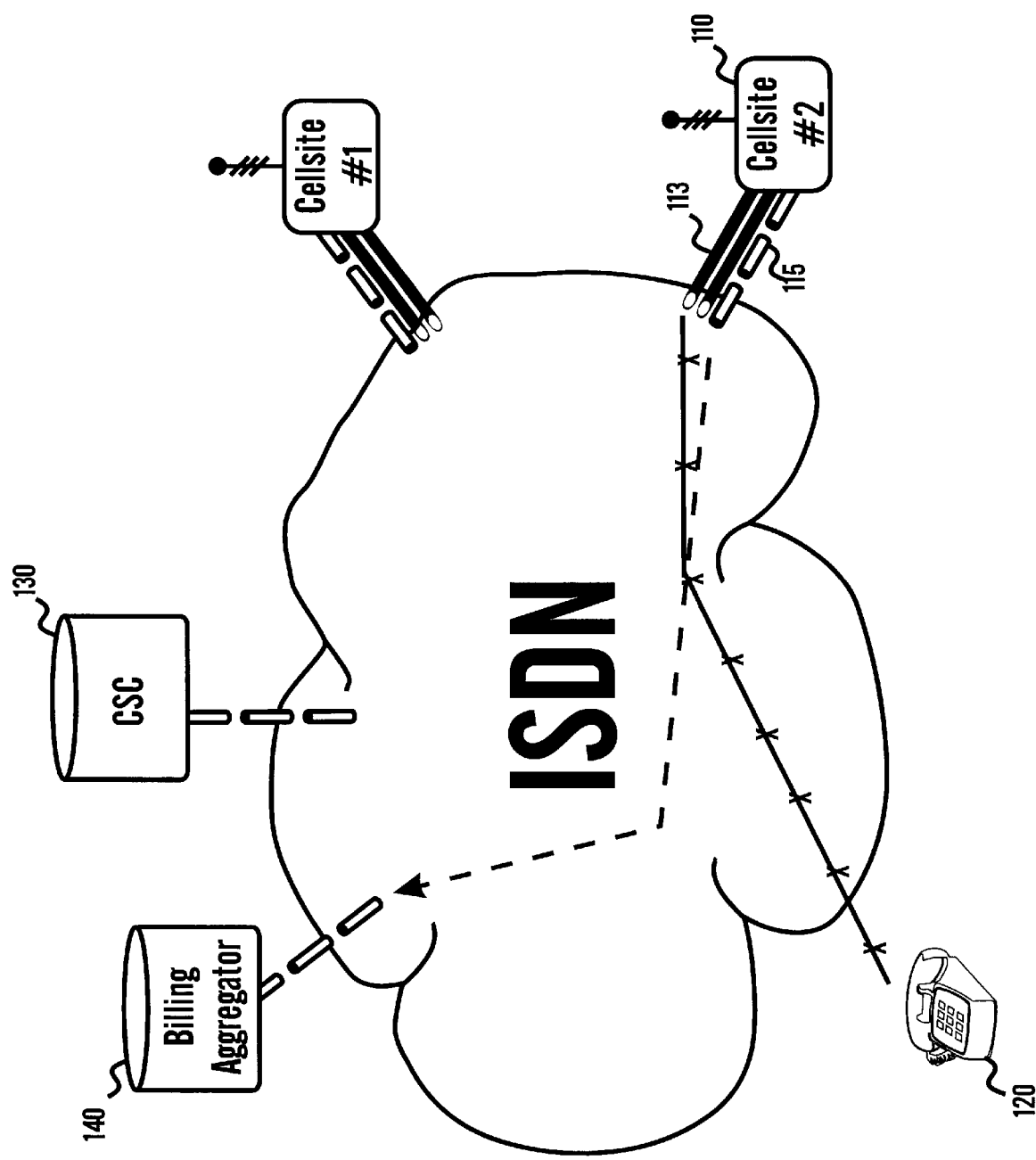
FIG. 6 is a diagram illustrating the termination of a call.

FIG. 6 illustrates the termination of a communication through the WISDN. Generally, termination of land to mobile, mobile to land or mobile to mobile communications is accomplished simply by having one of the communication devices, such as land phone 120 go on hook in order to end the call. As soon as the call is ended the ICS 110 outputs over the ISDN 100 data channel 115 a message to the RTAP 140. The message can contain such information as the CSR, the start and stop time of the call, the features used by the subscriber, whether the call was handed off from other ICSs 110, and the time during which the call was handled by those other ICSs 110. Such information allows the WISDN accurately to bill the user for the charges associated with using the network.

Call Hand Off

Intra-System Hand Off

Figure 7A:
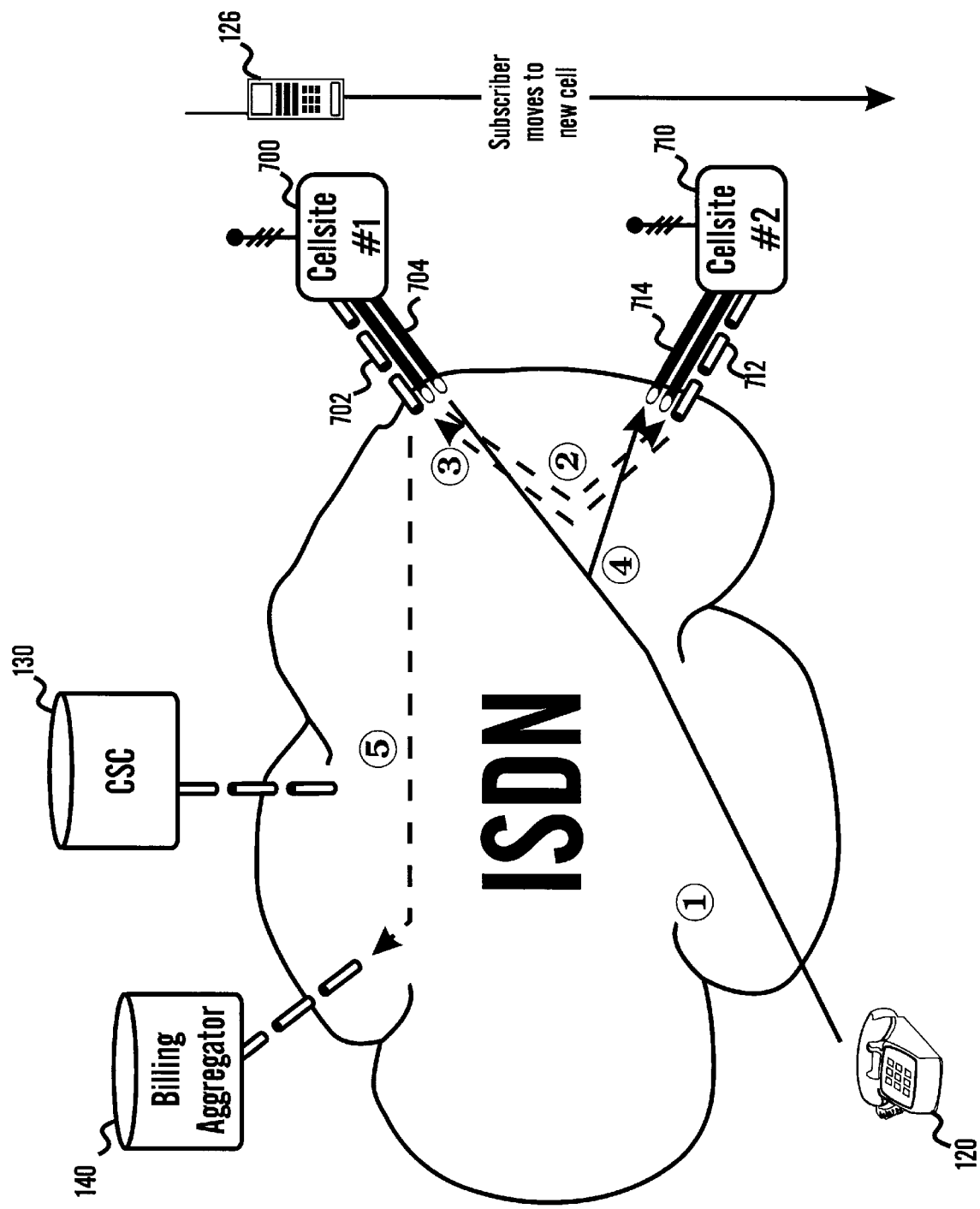
FIG. 7A is a diagram illustrating the hand off of a call as the mobile unit moves from a first cell into a second cell.
Figure 7B:
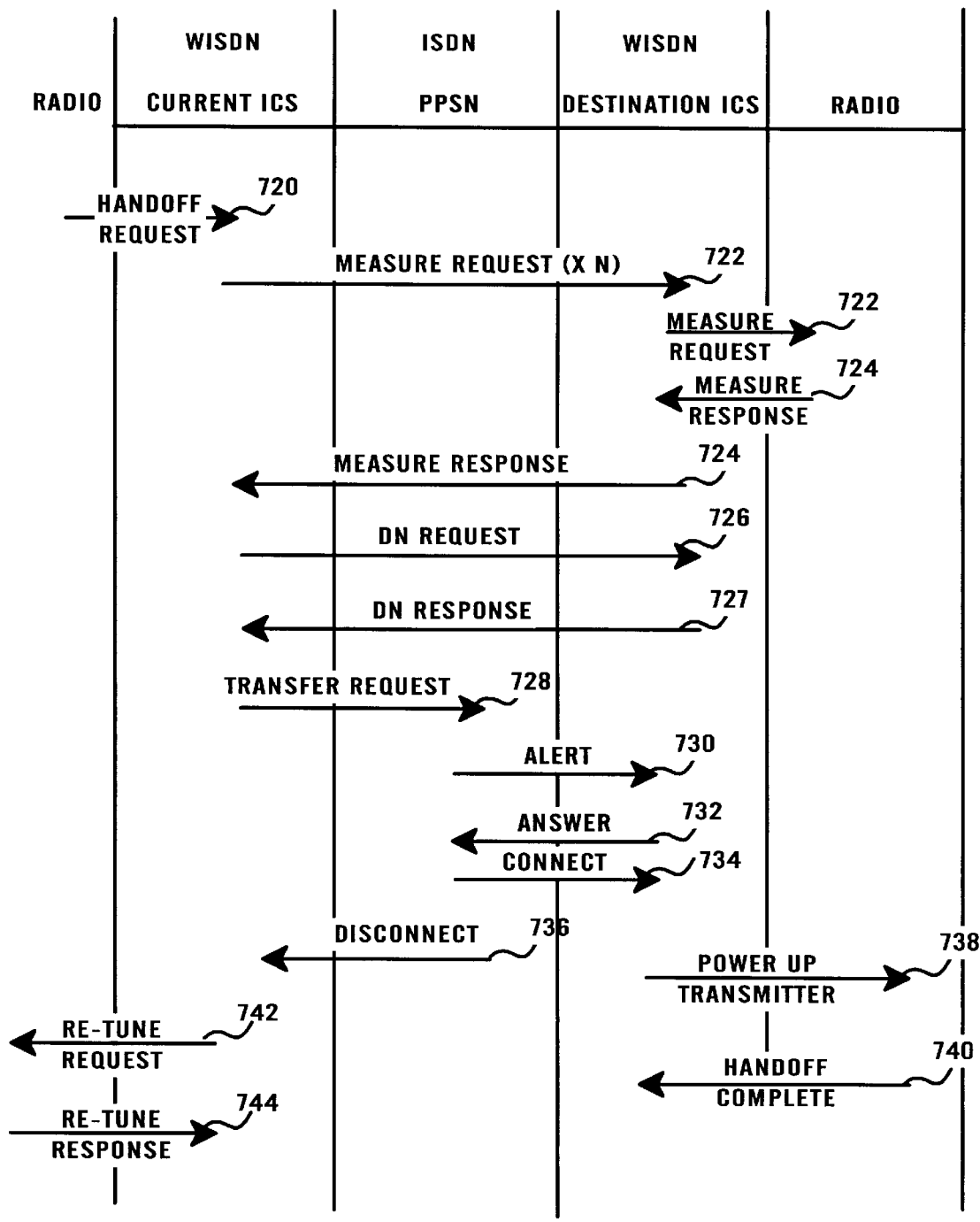
FIG. 7B is a call flow diagram showing the steps necessary to complete the hand off as the mobile unit moves from the first cell to the second cell.

When a mobile unit 126 moves from a first cellsite to a second cellsite, it is often necessary to switch or hand off the call from the base station serving the first cellsite to the base station serving the second cellsite. The determination of when to accomplish such a hand off may be made by detecting that the radio signal quality has deteriorated below a preset threshold. In the present invention, when the signal level of an active call goes below a certain threshold, as depicted in FIGS. 7A–B, the base station 114 senses the signal deterioration and a hand off request 720 may then be generated at the controlling interface and be received by a current ICS 700 handling that call. Neighboring ICSs 110 are instructed, via ISDN 100 data channel 115 X.25 measure request 722 messages, to have their base stations 114 tune to the frequency of the active call. Measure request 722 instructs the ICSs 110 to have their base stations 114 take a power reading from surrounding cells on the radio frequency over which the call operates and report back to the current ICS 700.

Choosing the surrounding ICSs 110 to which the measure requests 722 are directed may be accomplished by reviewing customer profile information to retrieve a call plan ID. The call plan ID may be used with a call plan neighbor list to generate a list of hand off candidates. Additionally, if a customer subscribes to any other systems, the call plan ID may be used to generate additional hand off candidates from a private neighbor list of hand off candidates. Measure requests 722 are then generated to each of the hand off candidates on the list. (Note that if any of the hand off candidates are located in another system, the inter-system hand off process described below may be followed for those candidates).

Each ICS, including the ultimate destination ICS 710, communicates with their controlling interfaces to instruct their respective base stations to read the signal strength of the call being processed by the current ICS 700. Multiple measure responses 724 are generated and passed over the PPSN 102 via ISDN 100 data channels 115 to the current ICS 700. Generally, each of the surrounding ICSs may compare their measure response 724 with the threshold received in the measure request 722. If better than the predetermined threshold (set by the current ICS 700), the measure response 724 may be sent to current ICS 700, which evaluates the measure responses 724 to determine the ICS best able to process the call. Because some of the measure responses are presumably better than the threshold, the current ICS 700 can either use a first response or select the best response received within a preselected time interval. The best response may be chosen by applying a "weighting factor," found in the neighbor on private neighbor lists to the responses to discount or increase the responses from selected candidates. If none of the ICSs return measure responses 724, presumably none are better able to handle the call than the current ICS 700, which may then decide to keep the call and generate a new set of measurement requests 722 periodically.

Assuming a destination ICS 710 is chosen by current ICS 700, a Directory Number ("DN") request 726 is sent from current ICS 700 to destination ICS 710, which sends a corresponding DN response 727. A hand off allocation request is sent to the destination ICS 710, which returns a hand off allocation response.

Optionally, each of the ICSs 110 could also use MAHO, in which case the mobile unit 126 takes signal strength measurements on the channels of the surrounding ICSs 110 or base stations whenever an empty time slot (during which the mobile unit 126 is neither transmitting nor receiving) occurs and reports those measurements to the current ICS 700. If MAHO is utilized, the current ICS 700 will automatically know when and to which surrounding ICS the call should be handed off. "When" to hand off is determined at the instant the mobile unit 126's signal strength falls below a predetermined threshold. Because the current ICS 700 has the constantly updated signal strength measurements, it can easily determine which surrounding ICSs 110 to choose for hand off. Thus, using MAHO eliminates the need for generating measurement requests and receiving measurement responses—the current ICS 700 can simply access a table to determine the directory number of the best hand off candidate (e.g. destination ICS 710) and send a handoff allocation request directly to the destination ICS 710.

The hand off allocation request may send customer profile information and a CSR to the destination ICS 710 and instruct the destination ICS 710 to allocate an ISDN 100 bearer channel 115 to the incoming hand off call. Alternatively, if the CSR indicates that the call is in call waiting or call conferencing mode, either of which involve two communication lines at the current ICS 700 dedicated to the mobile unit 126, the hand off allocation request causes the destination ICS 710 to allocate two ISDN bearer channels 115 for the incoming hand off. The hand off allocation response contains the identification of the ISDN bearer channel(s) 113 and the radio channel information necessary to complete the hand off. Current ICS 700 sends an ISDN data channel 702 X.25 transfer request 728 and alert 730 requesting a hand off to cellsite two, the cell served by destination ICS 710. Prior to generating an answer 732 that informs the current ICS 700 of the availability of the destination ICS 710, the destination ICS 710 may confirm that the incoming call is the correct call by comparing the calling line ID of the incoming call with the calling line ID stored in the CSR previously downloaded to the destination ICS 710. Destination ICS 710 may also analyze the CSR to determine if more than one bearer channel must be allocated prior to receiving the call, such as when the call is a conference call or in call waiting status. If the incoming call is in a call waiting state or call conferencing state, both assigned bearer channels 113 are connected to the radio channel via a conference port.

Connect 734 and disconnect 736 instructions are generated by the central office switches 104 that have an ISDN 100 feature such as fast transfer (also known as three-way calling without consultational hold) that completes the hand off. When using fast transfer, which eliminates the call hold and hold messages that are normally generated, the central office switches 104 generate a link between the open bearer channels 113 of the current and destination ICSs 700, 710. The disconnect 736 message is then sent to the current ICS 700 to terminate its processing of the call and the connect 734 message is sent to the destination ICS 710 to initiate the call processing by connecting the radio channel and bearer channel. A hand off complete message 740 may then be generated by the base station of the destination ICS 710; meanwhile, the current ICS 700 sends the mobile unit 126 a re-tune request 742 that informs the mobile unit 126 that it must tune to the new radio channel provided by the destination ICS 710. A re-tune response 744 from the mobile unit 126 confirms that the mobile unit 126 has tuned to the correct frequency, thus ending the hand off. Resources allocated to the call by the current ICS 700 may then be released. By using the ISDN 100 fast call transfer feature to execute the hand off, the transmission gap may be reduced.

Optionally, a call transfer feature (also known as three-way calling with consultational hold) or automatic link transfer or any other similar feature may be used to implement the hand off. Automatic line transfer works by having the central office switch 104 associated with the current ICS 700 send a meassage informing the destination ICS 710 of the call and requesting handoff. The destination ICS 710 then causes its central office switch 104 automatically to link the call with the destination ICS 710, resulting in transfer.

Inter-System Hand Off

Figure 8:
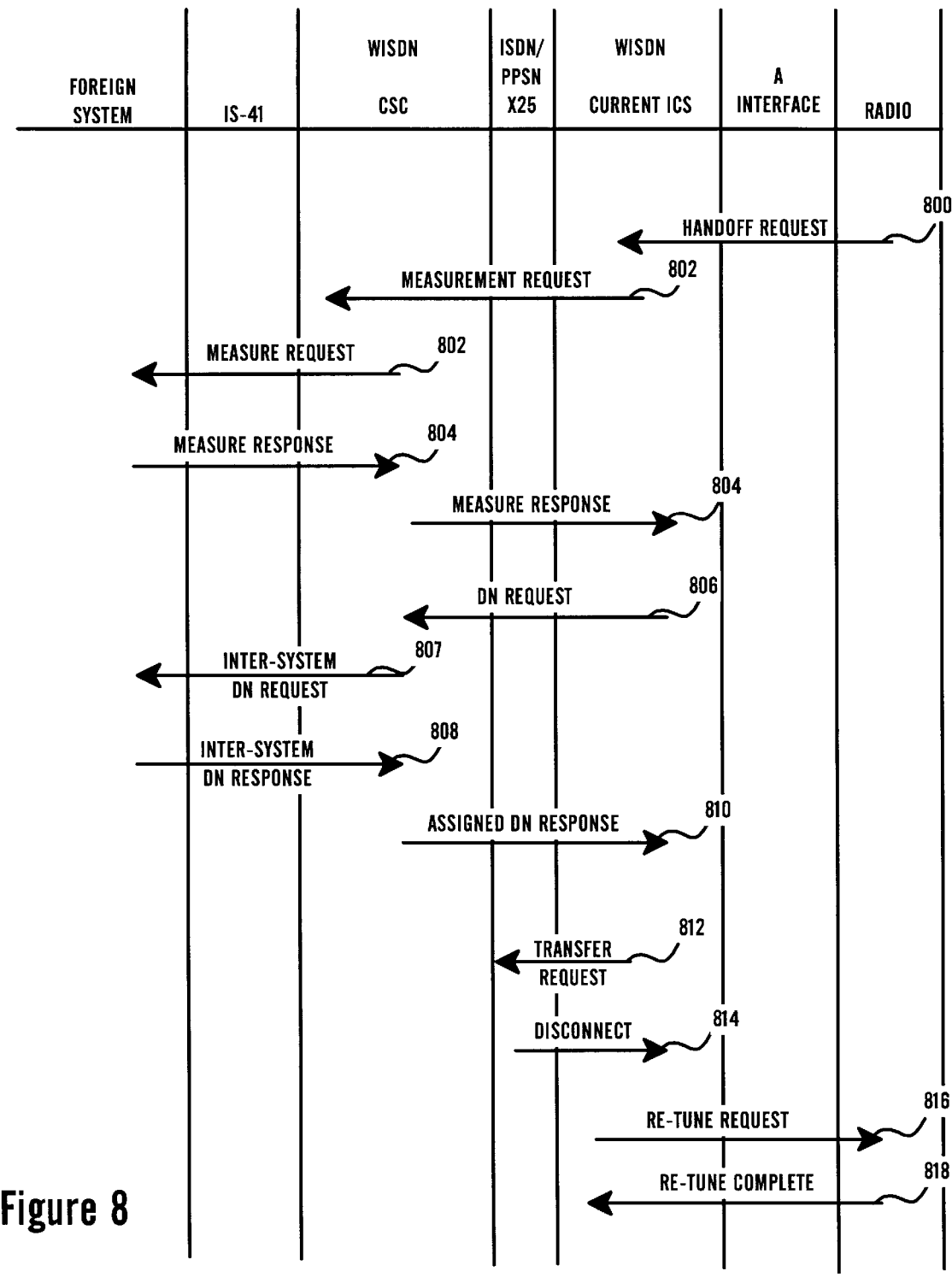
FIG. 8 is a call flow diagram showing the steps necessary to complete hand off of a call from the network of the present invention to a foreign system.

In some situations, such as when an ICS 110 is located within a cellsite bordering a foreign system, the ICS 110 cannot alone hand off the call since the appropriate base station 114 may be located in a foreign system. Generally, because of the difficulties and greater customer expense associated with inter-system handoffs (e.g. correlating billing information), the WISDN may be biased against such handoffs. For instance, when the serving ICS 700 receives measurement responses, it will subtract a certain amount from any measurement received from a foreign system before it assesses whether that response is better than the other received responses. Nevertheless, even with such a bias, call handoffs to foreign systems may still be generated. FIG. 8 illustrates such an inter-system hand off. An inter-system hand off occurs when the current ICS hands off a call to a base station in a foreign system. The hand off is handled similarly to the intra-system hand off described above except that the control messages are passed through the CSC 130.

Thus, internal hand off requests are generated at the current ICS, which selects a list of surrounding cells to receive measurement requests 802. When the surrounding cells include a neighbor cell hand off candidate located outside of the WISDN, the CSC 130 will receive a measurement request 802. CSC 130 communicates via, for example, IS-41 protocol with the foreign system to pass on the measurement request 802 and receive the measure response 804. CSC 130 receives and may analyze the measure responses 804 from the foreign system before sending them to the current ICS. CSC 130 analyzes the measure responses 804 only to determine whether the foreign system's base stations have measure responses 804 that are better than a predetermined threshold value for provided inter-system hand off. So long as the responses (minus, optionally, a set amount so that the WISDN is biased against inter-system hand off) exceed the current ICS's threshold or "goodness value," the CSC 130 will pass on the measurement responses 804 to the current ICS, which completes analysis of the measurement responses 804 and chooses the appropriate candidate for hand off. (Measurement responses from the external system are discarded in the event that the response indicate that the external system cannot provide better communication than the predetermined threshold. Measurement responses are also discarded if received after a deadline (i.e. the foreign system took too long to respond)).

If the current ICS chooses a foreign base station, it generates a DN request 806 that is received by the CSC 130 and translated into an inter-system DN request 807 in IS-41 protocol for transmission to the foreign system. Another buffer ICS 110 may be located between the central office switch 104 and the foreign system's MSC. To the foreign system's MSC, the buffer ICS 110 will appear to be simply another MSC communicating via a direct truck link, since the buffer ICS 110 will be able to communicate in a format understandable to the foreign system's MSC. Additionally, of course, the buffer ICS 110 will understand all of the CSC's 130 communications. The inter-system DN request 806 causes the foreign system to direct the chosen foreign base station to allocate the resources necessary to accept a call hand off. The foreign system sends an inter-system DN response 808, which contains the information necessary to identify the allocated resources, such as the number associated with routing the call to the candidate base station and the frequency to which the mobile unit 126 should tune for radio communicating with the foreign base station. The inter-system DN response 808 is received by the CSC 130 and passed on to the current ICS as an assigned DN response 810. Again, however, if MAHO is used and the current ICS selects the foreign system, measurement and directory number messages need not be sent since the current ICS can compare reported values, select the foreign base station, look up its directory number and generate a handoff request.

Similarly, measurement requests are received by the CSC 130 from foreign systems to request that ICSs 110 within the domain of the CSC 130 perform measurement on a mobile unit and accept call processing associated with that mobile unit. CSC 130 will receive and pass on these requests to the appropriate ICSs 110. Measurement responses from the ICSs 110 are passed back through the CSC 130 to the foreign system. The foreign system will then generate a hand off allocation request that requests the CSC 130 to accept the call by having the appropriate ICS 110 provide a radio and ISDN 100 voice channel. CSC 130 then generates a hand off allocation message to the appropriate ICS 110, which generates a corresponding hand off allocation response, informing the foreign system of the frequency to which the mobile unit should tune to complete hand off and how to route the call to the bearer channel 113 assigned by the chosen ICS 110.

Call Processing

Customer profile information may be stored on local databases within a particular network element. Thus, each ICS 110 may contain a database for storing particular customer profile information. Additionally, the CSC 130 has a database for storing customer profile information. If, at any time customer profile information must be accessed and is not found in the database of a network element performing a particular process, the network element may generate a request, over an ISDN data channel 115, to its parent element for customer profile information. Thus, the ICS 110 would request that the CSC 130 provide customer profile information. CSC 130 would in turn reference an HLR 150 or VLR 132 type database. Thus, CSC 130 has an external IS-41 massaging interface/gateway for formatting requests for customer profile information to foreign systems for users who are roaming within the WISDN coverage area. Other systems may directly interface with the VLR 132 to download or update customer information.

Triggers and primitive instructions or feature indicators, which indicate the optional service features that a particular subscriber is allowed, may be imbedded in the customer profile stored in the CSC 130 and downloaded to the ICS 110. Triggers and feature indicators can be passed on to the next ICS 110 when a call is handed off. One, "call restriction" feature indicator could be an instruction to allow, deny or alert a WISDN subscriber that a call hand off is occurring within certain identified zones of cells. That is, the call restriction feature could inform the ICS 110 to deny a WISDN subscriber a hand off to a cell located within a particular zone. Or, instead of qualifying the hand off, a feature indicator could be implanted that simply notifies the user, such as through a voice announcement or tone (provided by DSP chips within the ICS 110), as to when hand off occurs. Similarly, other feature indicators may instruct the ICS 110 to provide other services to a particular user, such as making a voice announcement indicating the status (e.g., busy) of the mobile unit to the party attempting to reach the mobile unit. Other feature indicators may also be implanted that initiate other services upon the occurrence of a predetermined event. Other services include: automatic speech recognition, call forwarding, call hold, additional call offering, flexible calling, calling number identification services, electronic key telephone system or call pickup.

Even more significantly, triggers can be implanted that cause the call processing to be interrupted as the ICS 110, queries another network element, such as CSC 130, for further instructions. Such instructions could include, for example, orders associated with that customer profile to prevent inter-system handoffs after a set time. This would allow, for instance, a large business such as a delivery service, to provide cellular phones to employees for unlimited business use during working hours while preventing the employee from incurring costly foreign system use charges during non-working hours. Alternatively, the subscriber could program a trigger that would route all incoming calls to another number (e.g. a voice mailbox, personal number or visited number) for a specified time period or indefinitely. Triggers may be actuated either upon the occurrence of a specified event (e.g. operation of a mobile unit) or upon receiving a preselected command sequence from the mobile unit (e.g. "#123"). The command sequence or event tells the ICS 110 to implement the trigger, which may result in providing virtually any of the calling services available or in causing the ICS 110 to access another network element for further instruction. Significantly, triggers provide flexibility in reprogramming the WISDN whenever new applications become available as the customer profile need only be embedded with a particular trigger in order to access such applications.

Call processing triggers and features also allow users to access features even during ongoing calls. For instance, the user of a mobile unit 126 may be communicating with a land phone 120 and may want to interrupt his current call, dial up a third party, toggle between the two calls and upon termination of one call, return to the remaining call. The user may input a code and punch the "SEND" key. The code informs the ICS 110 (which has received the users' customer profile from the CSC 130 or another ICS 110) that a preselected number must be dialed while the first call is interrupted. ICS 110 initiates the second call and requests that the central office switches 104 hold the first call. The user then toggles between the calls (pressing, for instance, "#1" ("pound" and "one") for the first call and "#2" ("pound" and "two") for the second) and terminates one or both at will.

Intelligent Peripherals can also be used with the present invention. The addresses of the Intelligent Peripherals are stored in the CSC 130, which may return those addresses in order to allow the SCP 106 to route calls to a particular Intelligent Peripheral upon which a desired application is run. CSC 130 also provides appropriate call data to the ICS 110 in order to allow the ICS 110 to instruct the Intelligent Peripheral in how to handle that call. Because these Intelligent Peripherals connect directly to the SCP 106, they can access all information on the PSTN (e.g., calling line ID) via the ISDN 100.

Customer profile information may contain not only basic caller identification information, but also the information necessary for the triggers to operate. Thus, a customer profile record could contain:

a user ID (the calling party's user identification or phone number);

a password associated with the user ID for security purposes and that may be compared with the password that may be retrieved at call initiation;

a feature indicator for identifying particular call features available to the customer, such as call forward unconditional (which forwards the call automatically to a preselected set of dialed digits), call forward no answer (which forwards the call to a preselected set of dialed digits when no answer is obtained) or call forward busy (which forwards the call to a preselected set of dialed digits when a busy signal is returned);

incoming and outgoing block flags that indicate whether incoming or outgoing calls should be blocked;

a last known area indicator that identifies the most recent ICS with which the user ID registered;

a PIC ID or preferred interexchange carrier identification number for users who wish to use long distance; or a call plan ID that establishes a calling plan for the particular user ID.

Various other information or flags necessary for providing other features or simply operating the network could be contained within the customer profile.

In addition to maintaining information on each customer, the WISDN tracks data on each call. A call status record ("CSR") is initialized at the beginning of a call and is maintained throughout the life of the call. It is used to keep track of the call state and all data (e.g., start, stop time, duration and call feature or trigger activation) pertinent to the call and may be shared with other processes in the WISDN that will need access to this type of information to process the calls or track the system load. Numerous CSRs are created for each call: one for the calling party and one for the called party. In the event of a call waiting or call conference, three CSRs are generated—one for each party (the called party, calling party and holding party). Each of the numerous associated CSRs relates to the other by having the same calling line ID. At least some of the features that may be created and stored within a CSR include:

a user ID, password and authorization code for the user ID (which allow records associated with the user ID to be accessed);

call and hand off status flags;

a call type record that records the type of features used;

timing records for recording the origination, connect and disconnect time;

calling line ID (for identifying the origination of the call);

an origination point record for indicating the origination point of the call within the WISDN;

a functional source and functional destination record for indicating respectively the current distant and local ends of a call;

various hand off records including: a hand off ICS ID (which identifies the ICS that is a candidate for a hand off), a neighbor count (the number of neighbors of the hand off ICS), a goodness value (a value that identifies the current signal strength of a call that is being processed by the original ICS that desires to hand the call off) or a hand off count (the number of hand offs the call has been through); or the call state of the call, which refers to the call processing stage the call may currently be in, such as whether the call is idle, talking, originating, locating, has a conference pending or active, is waiting for a connection, ringing or disconnecting.

Various other counters and pointer can be included in the CSR. Other data may be included in the CSR as needed to provide services to users of the WISDN and properly track and maintain the WISDN user data.

Real Time Automated Measurement Accounting Processor

Referring again to FIG. 1, it can be seen that the ICS 110 has the capability of sending packet data via the PPSN 102 to the CSC 130, VLR 132, RTAP 140, OA&M 150 or HLR 160. PPSN 102 allows the ICS 110 to output a call detail segment to the CSC 130 via the ISDN 100 data channel 115 and X.25 packet messages. The ICS 110 will output to the RTAP 140 such segments for reporting call origination, call termination and call hand off. Optionally, CSC 130 will assemble these call detail segments into one overall call detail record. Calls from roamers will be indicated on the call record. CSC 130 may then output the call detail record to RTAP 140, which is capable of outputting the billing records in the same AMA format and volume as a traditional cellular switch. However, in addition to these segments of information, the RTAP 140 can collect, organize and present information such as zone or feature billing to the billing operational support system of the wireless provider. The present invention is also capable of sending duplicate billing records to private billing systems. For example, if the customer profile record indicates that calls from the mobile unit 126 are billed to a company with a separate billing system such as a rental car company, the ICS 110 can output all of the billing information to that separate billing system directly (or to both the private system and the RTAP 140) via packet data messages through the PPSN 102 or any other public (e.g., X.25 or AIN-SS7) or private packet data network. This allows heavy volume users to track the amount of traffic in a real time manner.

Operations, Administration and Maintenance

OA&M 150 provides network support, maintenance alarms and messages, traffic engineering system reports and diagnostics. Adding, changing or deleting a customer can be accomplished by providing to the CSC 130 a communications protocol such as eithernet or an ASCII text single line command string equipped with acknowledgement messages and single line text with the appropriate instructions. CSC 130 has a recent change interface that supports such data entry, which is typically accomplished either manually at a local maintenance terminal, via a remote terminal emulation of a local maintenance terminal or by a switch interface subsystem. OA&M 150 is also used to report faults found by the diagnostic systems of the CSC 130 and ICS 110. Upon receiving such fault messages, the OA&M 150 will output an alarm message to the local maintenance terminal and to the maintenance operating and support system ("OSS"). Additionally, the OA&M 150 generates reports (both standard periodical reports and ad hoc reports for traffic engineers) that are used to determine the capacity growth needs of the overall system. Furthermore, a marketing information system can collect data from the billing system and generate periodic and ad hoc reports for marketing personnel.

The foregoing is provided for purposes of explanation and disclosure of a preferred embodiment of the present invention. Modifications and adaptations to the described embodiment, particularly including changes, upgrades or revisions to signalling and transmission protocols or standards (including without limitation, X.25, ISDN, IS-41 or AIN-SS7 standards), or changes in system architecture, will be apparent to those skilled in the art and may be made without departing from the scope or spirit of the invention and the following claims.

What is claimed is:

1. A method for providing hand off of a wireless communication as a mobile unit moves among a plurality of intelligent cellsites located within geographically dispersed cells, the method comprising the steps of:
   a. interconnecting through a PSTN, equipped with an ISDN defining a signalling channel and a plurality of communications channels, the intelligent cellsites with one another and a central site controller, which supports intersystems communication protocol and which is capable of communicating with a second wireless communication system operated by a mobile switching center, so that the intelligent cellsites can communicate with one another and the central site controller;
   b. initiating communication between the mobile unit and a first intelligent cellsite in which the mobile unit is first located;
   c. sensing that a signal from the mobile unit to the first intelligent cellsite has dropped below a predetermined threshold;
   d. selecting a second intelligent cellsite;
   e. causing the first intelligent cellsite to communicate with the second intelligent cellsite in order to hand off the wireless communication with the mobile unit to the second intelligent cellsite; and
   f. emulating a second mobile switching center in order to communicate with the second wireless system.

2. The method of claim 1 further comprising the step of handing off a call to the second wireless communication system by causing the central site controller to communicate a hand off request message to the second wireless communication system.

3. The method of claim 1 in which the emulating step is accomplished by interfacing an intelligent cellsite directly with the mobile switching center of the second wireless system.

4. A method according to claim 1 further comprising the step of causing a central office switch to execute the hand-off of the wireless communication between the first and the second intelligent cellsites.

5. A method according to claim 4 further comprising the step of verifying that the second intelligent cellsite received the correct hand in which the verifying step comprises the steps of:
   a. creating a call state record, at the first intelligent cellsite, comprising the calling line identification of the telephone number with which the mobile unit is communicating;
   b. forwarding the call state record to the second intelligent cellsite; and
   c. comparing, at the second intelligent cellsite, The calling line identification number within the call state record with a calling line identification number provided within a message sent by one of the central office switches before connecting the call to the second intelligent cellsite.

6. A method for providing communication between a plurality of mobile units provided with means for receiving and transmitting signals and a PSTN with at least one central office switch coupled lo a service control point coupled to a wireless integrated services digital network having a plurality of intelligent cellsites, a central site controller and a billing aggregator interconnected through the ISDN, the method comprising the steps of:
   a. receiving, at a first intelligent cellsite, a request for service from one of the mobile units;
   b. requesting, in response to the service request, authorization from the central site controller to provide communication service to the mobile user;
   c. allocating an ISDN bearer channel and radio frequency channel for the use of the mobile unit;
   d. informing the mobile unit of the radio frequency channel; and
   e. receiving a terminating number from the mobile unit and causing the first intelligent cellsite to communicate the terminating number; and
   f. verifying that the second intelligent cellsite received the correct hand off to the central office switch so that the mobile unit is connected to the terminating number, wherein the verifying step comprises the steps of:
  i. creating a call state record, at the first intelligent cellsite, comprising the calling line identification of the telephone number with which the mobile unit is communicating;
  ii. forwarding the call state record to the second intelligent cellsite; and
  iii. comparing, at the second intelligent cellsite, the calling line identification number within the call state record with a calling line identification number provided within a message sent by the central office switch before connecting the call to the second intelligent cellsite.

7. A method according to claim 6 in which the terminating number is the number of a second mobile unit communicating with a second intelligent cellsite and in which the step of causing the routing of the call to the second mobile unit comprises first causing the service control point to communicate with the central site controller to determine in which intelligent cellsite the mobile unit is located and then routing the call through the PSTN to the second intelligent cellsite.

8. A method according to claim 6 in which the central site controller supports inter systems communication protocol in order to communicate with a second wireless system operated by a mobile switching center and further comprising the step of emulating a second mobile switching center in order to communicate with the second wireless system.

9. Apparatus for converting a wireless communications network, having a plurality of base stations each deployed within a cell covering a specific geographic region and capable of radio communication with a mobile unit located within the cell, into a wireless integrated services digital network that interfaces with a PSTN equipped with ISDN and Public Packet Switched Network ("PPSN") capabilities in order to make use of the PSTN switching functionality to route calls generated within the PSTN to the mobile unit or route calls generated by the mobile unit to the PSTN and that can transfer and receive calls to and from a second wireless network, the apparatus comprising:
  a plurality of intelligent cellsites, each capable of interfacing with the base station located within the intelligent cellsite and communicating with one another via data messages transmitted over the ISDN, each intelligent cellsite comprising:
    i. means for communicating with the ISDN network in order to provide at least one signalling and a plurality of communications channels;
    ii. first means for interfacing with the base station to allow information received from the ISDN to be transmitted by the base station to the mobile unit;
    iii. second means for interfacing with the ISDN to allow information received from the base station to be transmitted over the ISDN; and
    iv. control means for allocating a radio and ISDN communication channel to allow the mobile unit to communicate with the ISDN network; and
  means for storing information relating to the mobile unit, wherein the storing means is interconnected with the ISDN in order to communicate with each intelligent cellsite, a service control point of the PSTN, and with the second network in order to execute the hand off of the mobile unit from a first base station to a second base station, wherein the storing means further comprises means for emulating a mobile switching center in order to execute hand offs with the second network.

10. Apparatus according to claim 9 in which the storing means stores data comprising customer profile information associated with the mobile unit for downloading to an intelligent cellsite in communication with the mobile unit.

11. Apparatus according to claim 10 in which the storing means generates registration requests to the intelligent cellsites to cause the mobile unit to register with a selected intelligent cellsite.

12. A wireless communication network, associated with a second, switched digital network, for using a distributed switching architecture to route communications to and from a plurality of users equipped with radio communication means through the switched digital network, the wireless communications network comprising:
  a) a first and second intelligent cellsite, each comprising a computer, an interface for communicating with a base station capable of radio communication with the users while they are located within a cell covering a preselected geographic area and a digital network interface;
  b) a central site controller comprising (i) a database for containing information associated with the users, (ii) means for sending and receiving packet data through the switched digital network, (iii) means for communicating with a service control point programmed to communicate with the central site controller and capable of controlling a plurality of central office switches for switching communications through the switched digital network and (iv) means for emulating a mobile switching center in order to execute hand offs with a second wireless network;
  c) a processor capable of processing billing information generated by communication with the users; and
  d) the switched digital network interconnects the first and second intelligent cellsites, the central site controller and the processor, wherein radio communications from users to a destination within the switched digital network are received at the base stations and pass through the interfaces of the first and second intelligent cellsites into the digital network interface to the central office switches so that the communications are routed to a destination within the switched digital network.

13. A method of handing off a wireless call, in response to degradation of a signal generated by a user, from a first intelligent cellsite having a base station in radio communication with the user to a second intelligent cellsite, wherein the method comprises the steps of:
  programming the central office switches of a PSTN with the capability of quickly transferring the call between the central office switches;
  determining that a hand off is required;
  selecting the second intelligent cellsite for receiving the hand off;
  transmitting a hand off request from the first intelligent cellsite to the second intelligent cellsite;
  causing the central office switch to connect the call to the second intelligent cellsite and disconnect the first intelligent cellsite; and
  verifying that the second intelligent cellsite received the correct hand off, in which the verifying step comprises the steps of:
    a. creating a call state record, at the first intelligent cellsite, comprising the calling line identification of the telephone number with which the mobile unit is communicating;
    b. forwarding the call state record to the second intelligent cellsite; and
    c. comparing, at the second intelligent cellsite, the calling line identification number within the call state record with a calling line identification number provided within a message sent by one of the central office switches before connecting the call to the second intelligent cellsite.

14. A method according to claim 13 in which the selecting step comprises the steps of:
   generating, at the first intelligent cellsite, a plurality of measurement requests for transmission to a plurality of surrounding intelligent cellsites, wherein the transmission is sent over ISDN signalling channels, associated with and interconnecting the first, second and the surrounding intelligent cellsites;
   receiving, at the surrounding intelligent cellsites, the measurement requests and generating measurement responses; and
   analyzing, at the first intelligent cellsite, the measurement responses to select the second intelligent cellsite.

15. A method according to claim 14 further comprising the steps of:
   a. storing customer profile information on a database; and
   b. sending the customer profile information associated with the user to the first intelligent cellsite.

16. A method according to claim 14 in which the customer profile information identifies the call features available to the user and further comprising the step of transferring the user's customer profile information to the second intelligent cellsite.

17. A method according to claim 14 further comprising the steps of:
   a. causing the mobile unit to assist in the hand off by determining and reporting the signal strength associated with a plurality of intelligent cellsites;
   b. reporting the measurements to the first intelligent cellsite; and
   c. analyzing the measurements to select a second intelligent cellsite.

18. A method according to claim 13 further comprising the step of reporting call processing information generated by the first intelligent cellsite to a private billing system communicating with the PSTN upon the termination of the call or upon successful hand off to the second intelligent cellsite.

19. A method according to claim 13 further comprising the step of interconnecting, through the ISDN, a billing aggregator with the intelligent cellsites and the central site controller.

20. The method of claim 13 in which the central site controller supports inter systems communications protocol and is capable of communicating with a second wireless communications system.

* * * * *